United States Patent
Yedid et al.

(10) Patent No.: US 12,481,211 B2
(45) Date of Patent: *Nov. 25, 2025

(54) SCANNING TELE CAMERA BASED ON TWO PRISM FIELD-OF-VIEW SCANNING

(71) Applicant: Corephotonics Ltd., Tel Aviv (IL)

(72) Inventors: Itay Yedid, Tel Aviv (IL); Ephraim Goldenberg, Tel Aviv (IL); Roy Rudnick, Tel Aviv (IL); Nadav Goulinski, Tel Aviv (IL); Tal Korman, Tel Aviv (IL); Yiftah Kowal, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 19/067,858

(22) Filed: Mar. 1, 2025

(65) Prior Publication Data

US 2025/0208496 A1 Jun. 26, 2025

Related U.S. Application Data

(63) Continuation of application No. 18/672,217, filed on May 23, 2024, now Pat. No. 12,265,320, which is a
(Continued)

(51) Int. Cl.
*G03B 37/02* (2021.01)
*G02B 7/09* (2021.01)
(Continued)

(52) U.S. Cl.
CPC .............. *G03B 37/02* (2013.01); *G02B 7/09* (2013.01); *G02B 13/0065* (2013.01);
(Continued)

(58) Field of Classification Search
CPC ...................................... G03B 37/02
See application file for complete search history.

(56) References Cited

U.S. PATENT DOCUMENTS 12,216,259 B2 * 2/2025 Goldenberg ........... G03B 13/36
12,265,320 B2 * 4/2025 Yedid ................. G02B 26/0816
(Continued)

FOREIGN PATENT DOCUMENTS

EP 3499286 B1 6/2019
EP 3707893 B1 9/2020

OTHER PUBLICATIONS

Extended Search Report in related EP patent application 24199717.0, dated Jan. 31, 2025.

*Primary Examiner* — Stephanie E Bloss
*Assistant Examiner* — Diana Hancock
(74) *Attorney, Agent, or Firm* — Nathan & Associates; Menachem Nathan

(57) ABSTRACT

Scanning Tele cameras (STCs) based on two optical path folding element (OPFE) field-of-view scanning and mobile devices including such STCs. A STC may comprise a first OPFE (O-OPFE) for folding a first optical path OP1 to a second optical path OP2, an O-OPFE actuator, a second OPFE (I-OPFE) for folding OP2 to a third optical path OP3, an I-OPFE actuator, a lens, a lens actuator and an image sensor, wherein the STC has a STC native field-of-view (n-$FOV_T$), wherein the O-OPFE actuator is configured to rotate the O-OPFE around a first axis and the I-OPFE actuator rotates the I-OPFE around a second axis for scanning a scene with the n-$FOV_T$, wherein the lens actuator is configured to move the lens for focusing along a third axis, and wherein the first axis is perpendicular to the second axis and parallel to the third axis.

20 Claims, 16 Drawing Sheets

Related U.S. Application Data continuation of application No. 17/766,831, filed as application No. PCT/IB2021/060244 on Nov. 5, 2021, now Pat. No. 12,271,105.

(60) Provisional application No. 63/110,057, filed on Nov. 5, 2020.

(51) Int. Cl.
| | |
|---|---|
| *G02B 13/00* | (2006.01) |
| *G02B 13/02* | (2006.01) |
| *G02B 26/08* | (2006.01) |
| *G02B 26/10* | (2006.01) |
| *G03B 30/00* | (2021.01) |
| *H04N 23/55* | (2023.01) |

(52) U.S. Cl.
CPC ......... *G02B 13/02* (2013.01); *G02B 26/0816* (2013.01); *G02B 26/10* (2013.01); *G03B 30/00* (2021.01); *H04N 23/55* (2023.01)

(56) References Cited

U.S. PATENT DOCUMENTS

| | | | |
|---|---|---|---|
| 2016/0070088 A1* | 3/2016 | Koguchi | G02B 15/144 |
| | | | 359/696 |
| 2016/0353008 A1* | 12/2016 | Osborne | G03B 13/36 |
| 2018/0217475 A1 | 8/2018 | Goldenberg | |
| 2019/0221026 A1 | 7/2019 | Tytgat | |
| 2023/0213737 A1 | 7/2023 | Bachar | |
| 2024/0126158 A1* | 4/2024 | Yedid | G02B 13/0065 |

\* cited by examiner

FIG. 1C      KNOWN ART

SCANNING TELE CAMERA BASED ON TWO PRISM FIELD-OF-VIEW SCANNING

CROSS REFERENCE TO RELATED APPLICATIONS

This is a continuation of U.S. patent application Ser. No. 18/672,217 filed May 23, 2024 (now allowed), which was a continuation of U.S. patent application Ser. No. 17/766,831 filed Apr. 6, 2022 (now allowed), which was a 371 application from international application PCT/IB2021/060244 filed Nov. 5, 2021, and is related to and claims the benefit of priority from U.S. Provisional patent application No. 63/110,057 filed Nov. 5, 2020, which is incorporated herein by reference in its entirety.

FIELD

The subject matter disclosed herein relates in general to compact mobile cameras and in particular to mobile scanning telephoto ("Tele") cameras.

BACKGROUND

Mobile electronic handheld devices (or just "mobile devices" or "electronic devices") such as smartphones having two or more compact cameras (also referred to as "multi-cameras") are known. The two or more cameras have lenses with different focal lengths that capture images of a same scene with different fields of view (FOVs). For example, a multi-camera may include a Wide camera having a Wide camera FOV ("$FOV_W$") of e.g. 80 degrees and a Tele (or "zoom") camera having a narrower FOV ("native $FOV_T$" or ("n-$FOV_T$") of e.g. 25 degrees and with higher spatial resolution (for example 3-5 times higher) than that of the Wide camera.

Tele cameras with scanning capability ("scanning Tele cameras" or "STCs") for expanding the native fields-of-view n-$FOV_T$ to an effective Tele FOV (also referred to as "scanning $FOV_T$" or "s-$FOV_T$") overcome some of the limitations that relate to narrow n-$FOV_T$s. Compact STCs can be realized in a folded camera such as described for example in co-owned U.S. Pat. No. 10,578,948, by having an optical path folding element (OPFE) rotated along one or two directions to direct (or "scan" or "steer") the n-$FOV_T$ towards arbitrary points of view (POVs) within s-$FOV_T$.

STCs based on rotating a single OPFE along two directions for FOV scanning have drawbacks, such as e.g. a limited scanning range (since in general s-$FOV_T$<$FOV_W$), POV aberrations, and the rotation of the image on the image sensor (known as "Roll" effect). Solutions that correct for POV aberrations and the Roll effect are described in co-owned international patent application PCT/IB2021/056311.

There is need and it would be beneficial to have a compact scanning Tele camera for incorporation in a mobile device that supports all of the following conditions:
Large s-$FOV_T$, e.g. s-$FOV_T$=$FOV_W$;
$FOV_T$ scanning without causing POV aberrations and/or a Roll effect; and
Use of lenses having large aperture areas, given the size constraints of modern mobile devices (particularly of smartphones).

SUMMARY

In various embodiments, there are provided scanning Tele cameras (STCs) comprising: an O-OPFE for folding a first optical path OP1 to a second optical path OP2; an O-OPFE actuator; an I-OPFE for folding OP2 to a third optical path OP3; an I-OPFE actuator; a lens; a lens actuator; and an image sensor; wherein the STC has a STC native field-of-view n-$FOV_T$, wherein the O-OPFE actuator is configured to rotate the O-OPFE around a first axis and the I-OPFE actuator rotates the I-OPFE around a second axis for scanning a scene with the n-$FOV_T$, wherein the lens actuator is configured to move the lens for focusing along a third axis, and wherein the first axis is perpendicular to the second axis and parallel to the third axis.

In some embodiments, a STC as above or below is included in a camera module, wherein the camera module is divided into a first region having a module region height $H_M$ and a second region having a shoulder region height $H_S$, the lens having a maximum aperture height $H_A$, all heights being measured along OP1, wherein $H_S$<$H_A$+3 mm. In some embodiments, $H_S$<$H_A$+2 mm. In some embodiments, $H_S$<$H_A$+1.5 mm. In some embodiments, $H_S$<8 mm and $H_M$<10 mm. In some embodiments, $H_S$<6.5 mm and $H_M$<8.5 mm.

In some embodiments, the I-OPFE has a height $H_{I\text{-}OPFE}$ measured along OP1, wherein $H_{I\text{-}OPFE}$<$H_A$+2 mm. In some embodiments, $H_{I\text{-}OPFE}$<$H_A$1.5 mm.

In some embodiments, the O-OPFE has a height $H_{O\text{-}OPFE}$ measured along OP1, wherein $H_M$<$H_{O\text{-}OPFE}$+3 mm. In some embodiments, $H_M$<$H_{O\text{-}OPFE}$+2 mm.

In some embodiments, the scanning provides an effective Tele scanning FOV s-$FOV_T$ and a horizontal dimension H-$FOV_T$ of s-$FOV_T$ greater than 50 degrees. In some embodiments, H-$FOV_T$>60 degrees.

In some embodiments, the lens is positioned between the I-OPFE and the image sensor.

In some embodiments, OP1, OP2 and OP3 are perpendicular to each other.

In some embodiments, the rotation of the O-OPFE is around a first axis parallel to OP3 for scanning the n-$FOV_T$ in a first scan direction, and the rotation of the I-OPFE is around a second axis parallel to OP1 for scanning the n-$FOV_T$ in a second scan direction.

In some embodiments, the rotation of the O-OPFE and of the I-OPFE is by more than ±7.5 degrees around a zero scan position.

In some embodiments, the rotation of the O-OPFE and of the I-OPFE is by more than ±10 degrees around a zero scan position.

In some embodiments, the O-OPFE is a prism made of a material having a refractive index n>1.7.

In some embodiments, the I-OPFE is a prism.
In some embodiments, the I-OPFE is a mirror.
In some embodiments, the O-OPFE and the I-OPFE are included in respective O-OPFE and I-OPFE holders, and both the O-OPFE holder and the I-OPFE holder include a stray light mask.

In some embodiments, the I-OPFE holder is included in a housing made of metal.

In some embodiments, the I-OPFE holder is included in a housing with a height $H_{I\text{-}H}$ measured along OP1, wherein $H_{I\text{-}H}$<0.5 mm.

In some embodiments, the I-OPFE holder is included in a housing with a height $H_{I\text{-}H}$ measured along OP1, wherein $H_{I\text{-}H}$<0.25 mm.

In some embodiments, an STC has an effective focal length EFL of 7-10 mm. In some embodiments, an STC has an EFL of 10-25 mm. In some embodiments, an STC has an EFL of 25-50 mm.

In some embodiments, the O-OPFE and/or the I-OPFE actuator includes a voice coil motor.

In some embodiments, the lens may be a cut lens that includes one or more lens elements $L_i$, wherein each lens element has a height $H_{Li}$ measured along OP1 and a width $W_{Li}$ measured along OP2 and wherein $H_{Li} \leq 0.9 \cdot W_{Li}$ In various embodiments, there is provided a mobile device comprising a STC as above or below, wherein the mobile device has a regular region with a regular height H and a bump region with a bump height $H_B$, wherein the I-OPFE, the lens and the image sensor are included in the regular region and wherein the O-OPFE is included in the bump region.

In some embodiments, the mobile device further comprises a Wide camera having a Wide camera image sensor and a Wide field-of-view $FOV_W$ and an application processor (AP). In some embodiments, the AP is configured to use image data from the Wide camera for autonomous scanning of a scene with the STC's n-$FOV_T$. In some embodiments, the AP is configured to scan a scene with the STC's n-$FOV_T$ according to a user's input. In some embodiments, the mobile device further comprises an Ultra-Wide camera.

In various embodiments, there is provided a multi-camera comprising any of the STCs above or below together with a Wide camera having a Wide camera image sensor and a Wide field-of-view $FOV_W$, wherein s-$FOV_T$ has a horizontal dimension H-$FOV_T$ and wherein $FOV_W$ has a horizontal dimension H-$FOV_W$.

In some embodiments, H-$FOV_T$>0.7×H-$FOV_W$.

In some embodiments, H-$FOV_T$>0.8×H-$FOV_W$. In some embodiments, H-$FOV_T$=H-$FOV_W$. In some embodiments, s-$FOV_T$=$FOV_W$. In some embodiments, s-$FOV_T$ covers a 16:9 segment of $FOV_W$.

In some embodiments, the Wide camera image sensor and the STC image sensor have respective imaging planes that are oriented perpendicular to each other.

In some embodiments, a center location of s-$FOV_T$ is identical with a center location of $FOV_W$.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated by like numerals. Elements in the drawings are not necessarily drawn to scale.

FIG. 1C shows a dual-camera FOV that includes a $FOV_W$, a s-$FOV_T$ and 9 n-$FOV_T$s from a known folded STC camera;

DETAILED DESCRIPTION

Figure 1A:
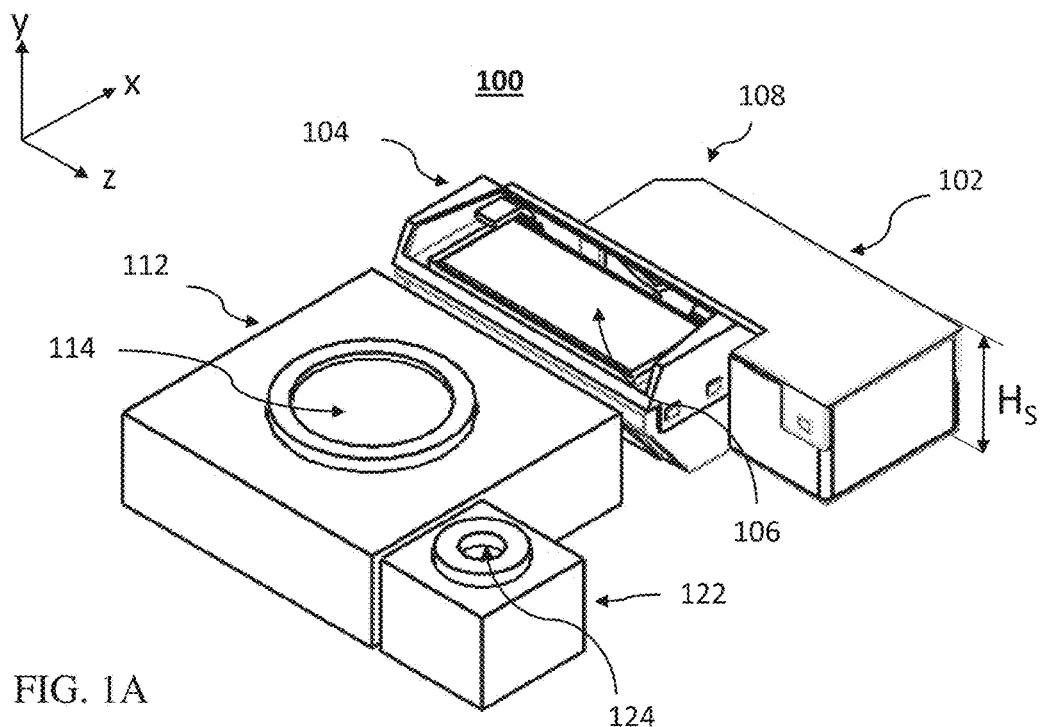
FIG. 1A shows a multi-camera including a folded STC disclosed herein.

FIG. 1A shows a multi-camera numbered 100 that comprises a folded STC numbered 102 according to some embodiments disclosed herein. STC 102 includes an aperture 104 and an object-side OPFE (O-OPFE) 106 and is included in a STC camera module 108. Multi-camera 100 further comprises a Wide camera 112 having a Wide aperture 114 and an Ultra-Wide camera 122 having an Ultra-Wide aperture 124. An image sensor (not shown) of STC 102 is located in a plane substantially parallel to the x-y-plane. An image sensor (not shown) of Wide camera 112 is located in a plane substantially parallel to the x-z-plane.

Figure 1B:
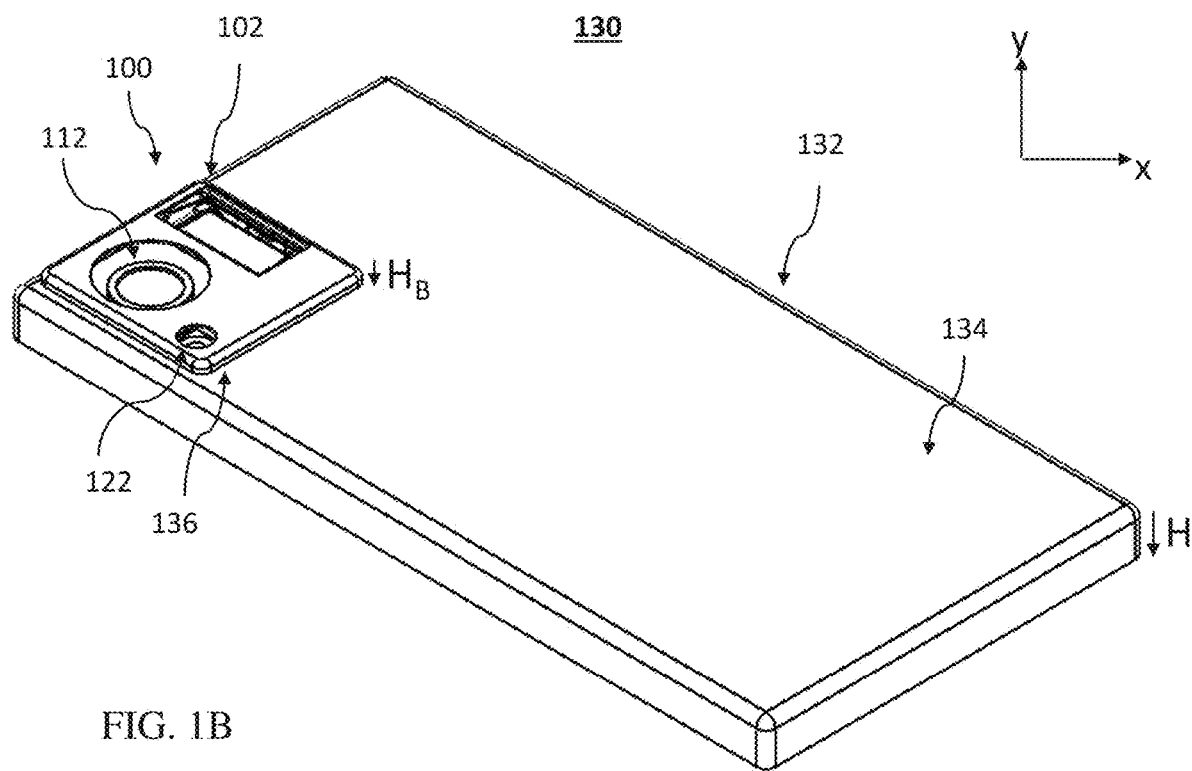
FIG. 1B shows handheld device including that includes the multi-camera of FIG. 1A in a perspective view.

FIG. 1B shows a mobile device (e.g. a smartphone) numbered 130 that includes multi-camera 100 in a perspective view. A rear surface 132 of mobile device 130 is visible. A front surface (not visible) may include a screen. Rear surface 132 is divided into two regions, a first regular region 134 where device 130 has a height H, and a second, "bump" region 136 where device 130 has a height H+$H_B$ ($H_B$ being the height of the bump). In some embodiments, multi-camera 100 may be entirely included in bump region 136. In other embodiments and as for example shown in FIG. 4, a first region of multi-camera 100 having a first height $H_1$ may be included in bump region 136, whereas a second region of multi-camera 100 having a second height $H_2$ ($H_2<H_1$) may be included in regular region 134. The latter is preferred from an industrial design point of view, as it allows minimizing the area size of bump region 136. Mobile device 130 may additionally include an application processor (AP—not shown). In some examples, the AP may be configured to scan a scene with STC 102's n-$FOV_T$ according to a user input. In other examples, the AP may be configured to use image data from a Wide camera such as camera 112 to autonomously scan a scene with STC 102's n-$FOV_T$.

FIG. 1C shows a known dual-camera field-of-view 140 that includes a $FOV_W$ from a Wide camera, a known STC s-$FOV_T$, and 9 n-$FOV_T$s from the known STC, marked 1-9. The center locations of $FOV_W$ and s-$FOV_T$ are identical. The 9 n-$FOV_T$s represent the extreme scanning positions of the STC. For example, n-$FOV_T$2 corresponds to the maximum scanning position along the positive y direction, n-$FOV_T$3 corresponds to the maximum scanning position along both the positive y direction and the positive x direction, etc. Each n-$FOV_T$ has a n-$FOV_T$ center. For example, the center n-$FOV_T$7 is indicated by "Center Native $FOV_T$7". A horizontal distance ("LC-$FOV_T$–RC-$FOV_T$", measured along x) between the n-$FOV_T$ center of a maximum left scanning position ("LC-$FOV_T$") and the n-$FOV_T$ center of a maximum right scanning position ("RC-$FOV_T$") is also marked.

In the example related to FIG. 1C, $FOV_W$ is 64 degrees in a horizontal direction ("H-$FOV_W$", along the x-axis) and 48 degrees in a vertical direction ("V-$FOV_W$", along the y-axis). $FOV_T$ is 46 degrees in the horizontal direction ("H-$FOV_T$") and 36 degrees in the vertical direction ("V-$FOV_T$") Here, LC-$FOV_T$–RC-$FOV_T$=27 degrees. That is, $FOV_T<FOV_W$. In this example, H-$FOV_T$~0.7×H-$FOV_W$. This means that the STC cannot capture objects located at the edges of $FOV_W$. POV aberrations and a Roll effect are visible in n-$FOV_T$s 1, 3, 4, 6, 7 and 9.

Figure 1D:
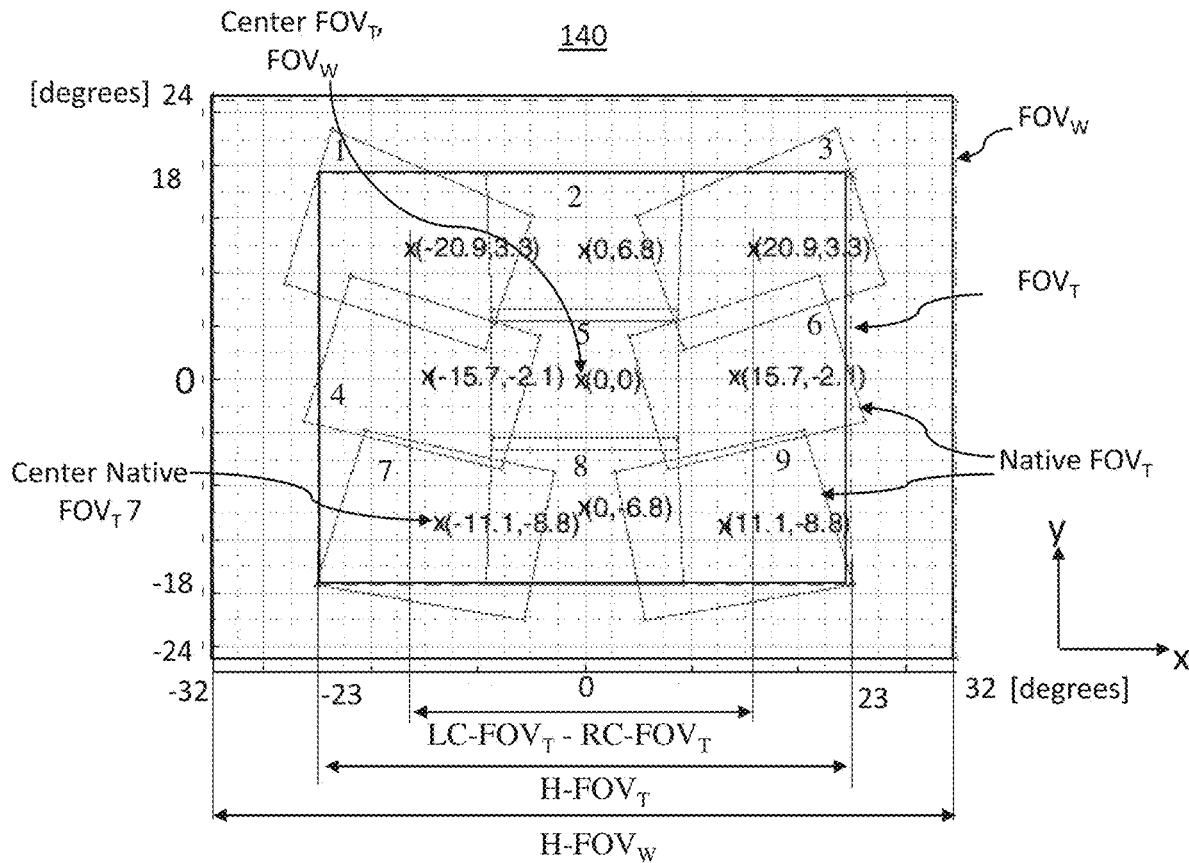
FIG. 1D shows a dual-camera FOV that includes a $FOV_W$, a s-$FOV_T$ and 9 n-$FOV_T$s from a folded STC camera as disclosed herein.
Figure 1D:
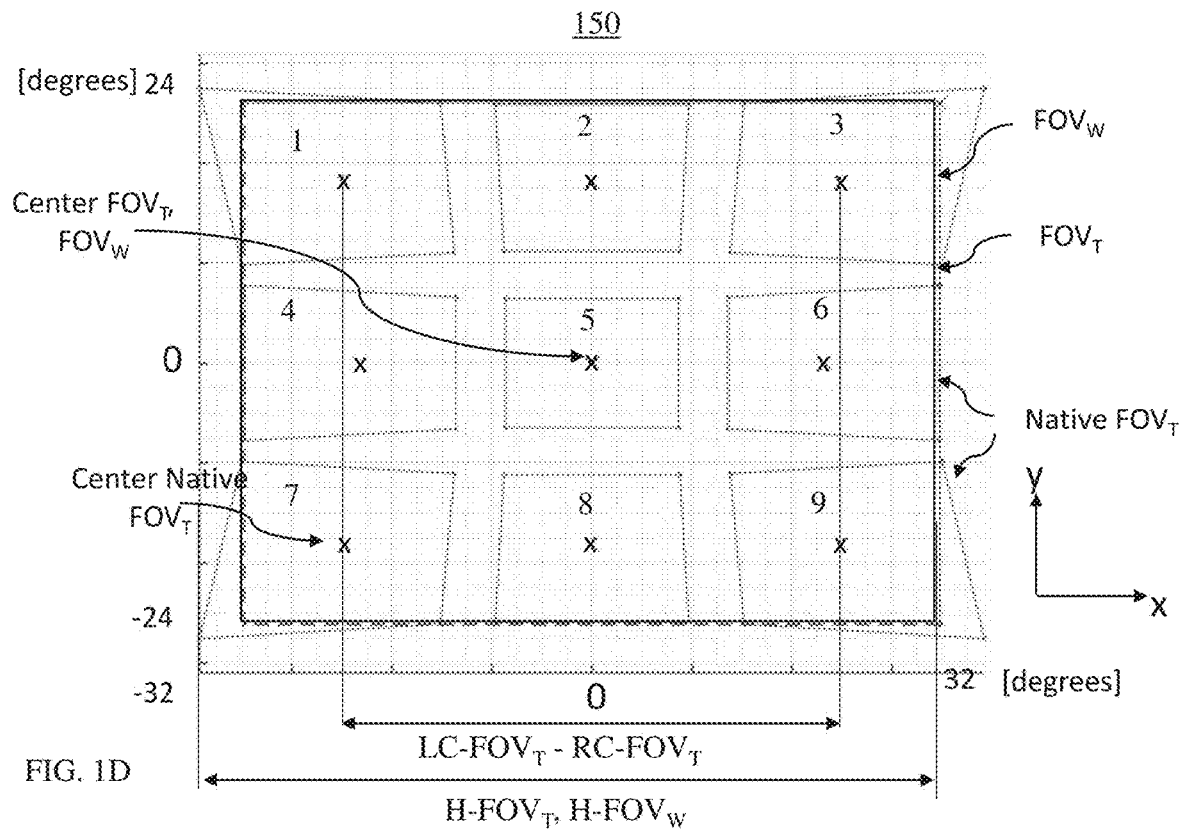

FIG. 1D shows a dual-camera field-of-view 150 that includes a $FOV_W$, a s-$FOV_T$ and 9 native n-$FOV_T$s of a STC camera as disclosed herein. The center locations of $FOV_W$ and s-$FOV_T$ are identical. As in FIG. 1C, $FOV_W$ is H-$FOV_W$=64 degrees and V-$FOV_W$=48 degrees. Here, LC-$FOV_T$–RC-$FOV_T$=41 degrees. In FIG. 1D, s-$FOV_T$ ~$FOV_W$, H-$FOV_W$~H-$FOV_T$ and V-$FOV_W$~V-$FOV_T$. This means that the STC can capture all objects located in $FOV_W$. Significantly less pronounced POV aberrations and no Roll effects are visible in the n-$FOV_T$s 1, 3, 4, 6, 7 and 9.

In other embodiments, s-$FOV_T$ may cover a 16:9 image ratio of $FOV_W$, i.e. H-$FOV_T$ may be equal to or even larger than H-$FOV_W$, but V-$FOV_T$ may be smaller than V-$FOV_W$, e.g. according to a ratio of 16:9.

Figure 2A:
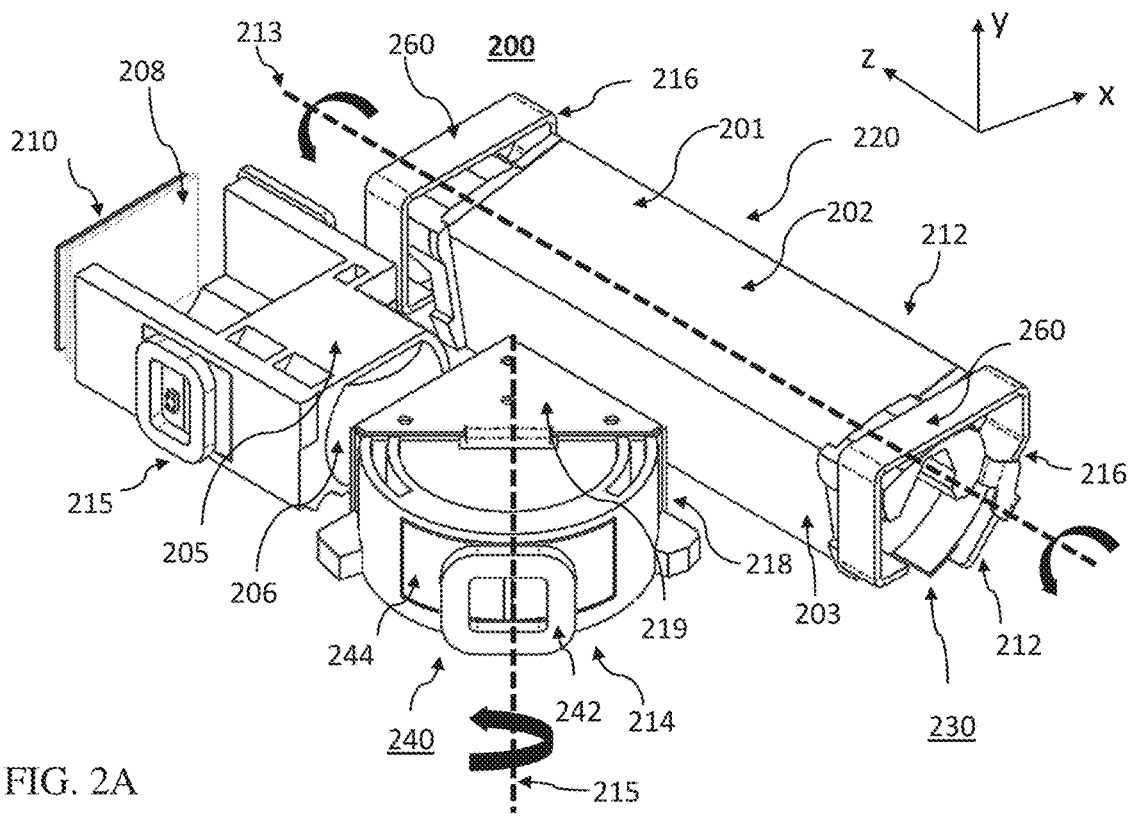
FIG. 2A shows an embodiment of a folded STC disclosed herein in a first perspective view.
Figure 2B:
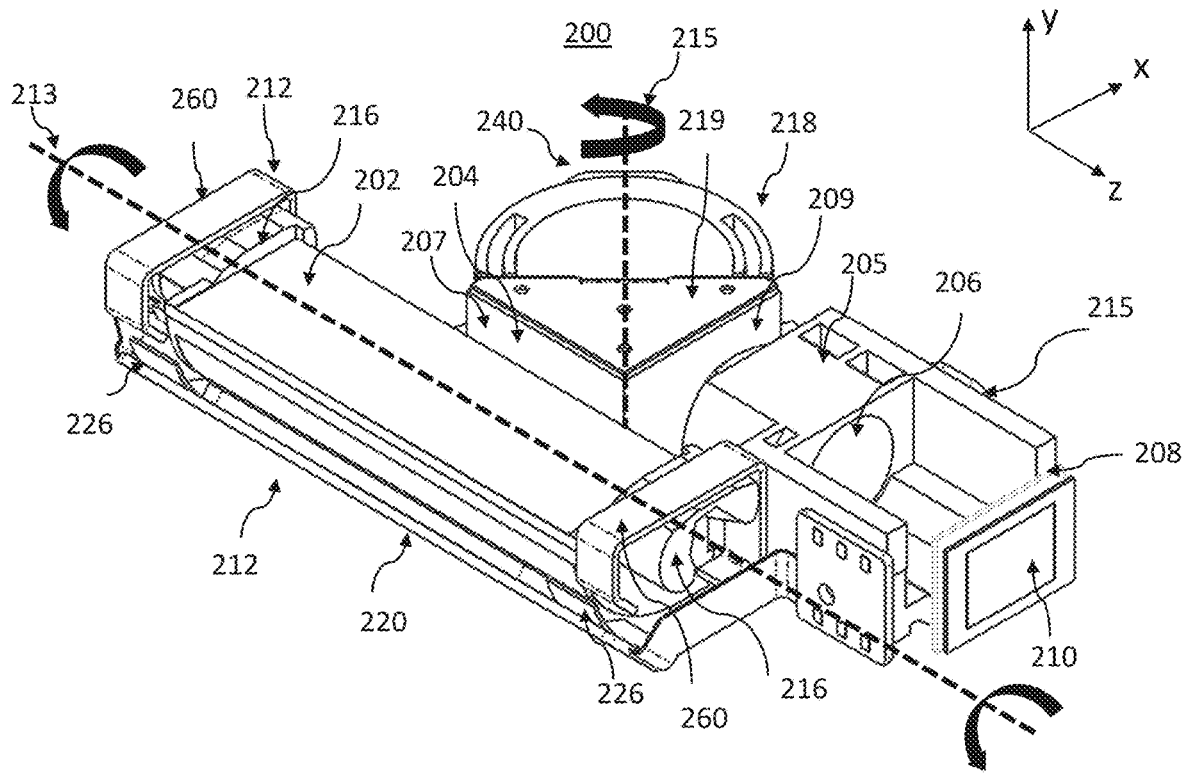
FIG. 2B shows the folded STC of FIG. 2A in a second perspective view.

FIG. 2A shows an embodiment of a folded STC numbered 200 disclosed herein in a perspective view. FIG. 2B shows folded STC 200 in another perspective view. With reference to the coordinate system of FIG. 2A, STC 200 comprises an O-OPFE 202 (e.g. a prism or mirror) for folding a first optical path ("OP1") which is substantially parallel to the y-axis to a second OP ("OP2") which is substantially parallel to the x-axis, an image-side OPFE ("I-OPFE") 204 (e.g. a prism or mirror, not visible in FIG. 2A) for folding OP2 to a third optical path ("OP3") which is substantially parallel to the z-axis. In addition, STC 200 comprises a lens barrel 205 including a lens 206 (only partially visible here), an optional optical window 208 (e.g. an IR filter), and an image sensor 210. OP1, OP2 and OP3 are perpendicular to each other.

O-OPFE 202 is carried by an O-OPFE holder 216 and I-OPFE 204 is carried by an I-OPFE holder 218.

It is visible that the optically active areas of O-OPFE 202, a top area 201 which (in zero scan position) is oriented parallel to the x-z-plane and a side area 203 which is oriented parallel to the y-z-plane, are larger in size than the optically active areas of I-OPFE 204, a first side area 207 which (in zero scan position) is oriented parallel to the y-z-plane and a second side area 209 which is oriented parallel to the x-y-plane. The larger optical areas of O-OPFE 202 are required to provide light from all optical fields and for all scan positions of I-OPFE 204.

In use, for scanning a scene with n-$FOV_T$ and/or optical image stabilization (OIS), an O-OPFE actuator 212 rotates O-OPFE 202 around a rotation axis 213 substantially parallel to OP3, and an I-OPFE actuator 214 rotates I-OPFE 204 around a rotation axis 215 substantially parallel to OP1. A barrel actuator 215 (e.g. a voice coil—VCM) moves lens barrel 205 substantially parallel to OP3 for autofocusing (AF). In other examples, a barrel actuator such as 215 may additionally move a lens barrel like 205 substantially parallel to OP1 and/or OP2 for OIS. STC 200 includes an O-OPFE drop prevention module 260 designed to prevent O-OPFE holder 212 from falling out of a camera module that includes STC 200 if a mobile device including the camera module is dropped. I-OPFE holder 218 includes an I-OPFE housing 219. In some camera module embodiments (such as in an embodiment 360 below), I-OPFE housing 219 has a "C" shape, meaning that it surrounds I-OPFE 204 on three sides that are not optically active (top, bottom and back).

STC 200 may have an effective focal length (EFL) in the range of EFL=5-50 mm.

O-OPFE actuator 212 includes an O-OPFE actuation module 220 and an O-OPFE sensing module 230. The two modules may be separate modules. O-OPFE sensing module 230 is located at both sides of O-OPFE holder 216. O-OPFE actuation module 220 includes a coil 222 (not visible here, but shown in FIG. 3B), an actuation magnet 224 (not visible here, but shown in FIG. 3B) and an actuation yoke 226. O-OPFE sensing module 230 includes a position sensor (e.g. a Hall sensor) 232 (see FIG. 5A) and a sensing magnet 234 (see FIG. 5A). An advantage of separating O-OPFE actuation module 220 and O-OPFE sensing module 230 is that position sensor 232 is decoupled from actuation coil 222.

I-OPFE actuator 214 includes an I-OPFE actuation module 240 and an I-OPFE sensing module 250. The two modules may be separate modules. I-OPFE actuation module 240 includes an actuation coil 242 and an actuation magnet 244. I-OPFE sensing module 250 includes a position sensor (e.g. a Hall sensor) 252 (shown in FIG. 7A) and a sensing magnet 254 (shown in FIG. 7A). An advantage of separating I-OPFE actuation module 240 and I-OPFE sensing module 250 is that position sensor 252 is decoupled from actuation coil 242. The rotation axis 215 of I-OPFE 204 is at a relatively large distance from I-OPFE actuation module 240, so there is a large lever for rotating I-OPFE 204. The rotation axis 215 of I-OPFE 204 is at a relatively close distance from I-OPFE sensing module 240, so that the rotation of I-OPFE 204 can be sensed with a small stroke, i.e. over a small distance.

Figure 3A:
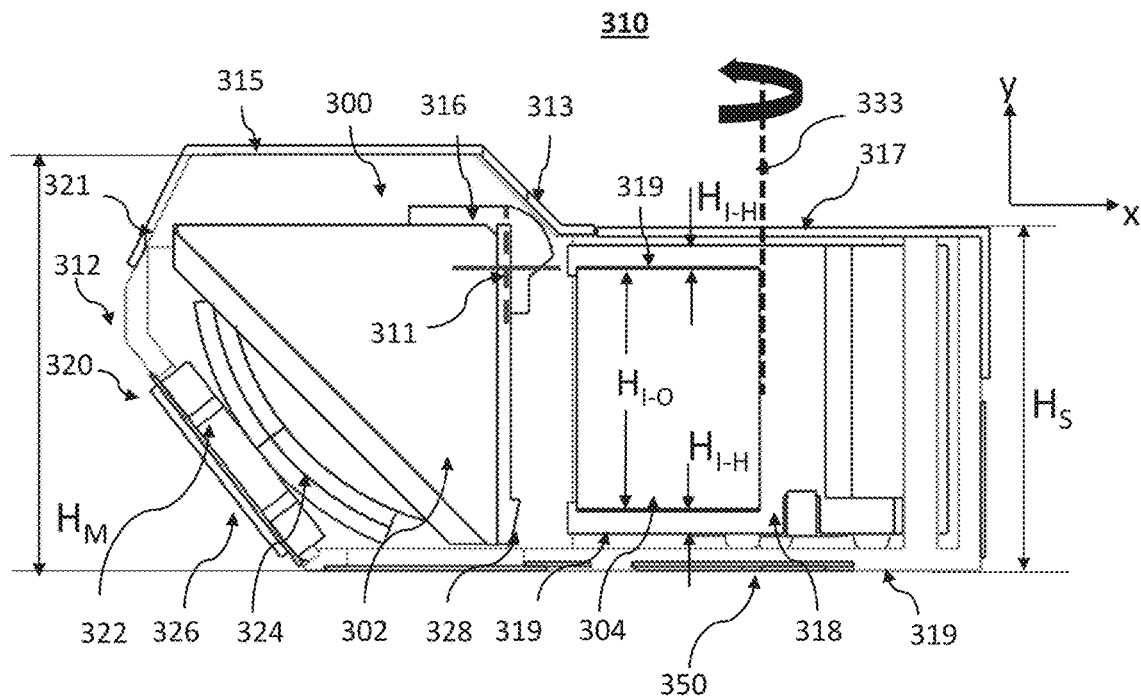
FIG. 3A shows a segment of a handheld device that includes a folded STC as in FIG. 2A in a cross-sectional view.

FIG. 3A shows a cross-sectional view of an embodiment of a camera module numbered 310 that includes an STC disclosed herein and numbered 300. Camera module 310 is housed in (surrounded by) a camera module housing 321. STC 300 comprises an O-OPFE 302 (e.g. a prism) carried by an O-OPFE holder 316 for folding a first OP1 to a second OP2, an I-OPFE 304 (e.g. a prism) carried by an I-OPFE holder 318 for folding OP2 to a third OP3, a lens barrel (not shown) including a lens (not shown), an optional optical element (not shown), and an image sensor (not shown). OP1 and OP2 and OP3 are not shown, but are perpendicular to each other and are oriented along identical axes as shown for STC 200.

O-OPFE actuator 312 rotates O-OPFE 302 around axis 311 substantially parallel to OP3 and an I-OPFE actuator 314 (not visible here, see FIGS. 9A, 9B) rotates I-OPFE 304 around axis 333 substantially parallel to OP1. A barrel actuator (not shown) linearly moves the lens barrel substantially parallel to OP3 for AF. In other examples, the barrel actuator may additionally linearly move the lens barrel substantially parallel to OP1 and/or OP2 for OIS. I-OPFE holder 318 includes an I-OPFE housing 319. STC 300 may have an effective focal length (EFL) in the range of EFL=5-50 mm.

Figure 5A:
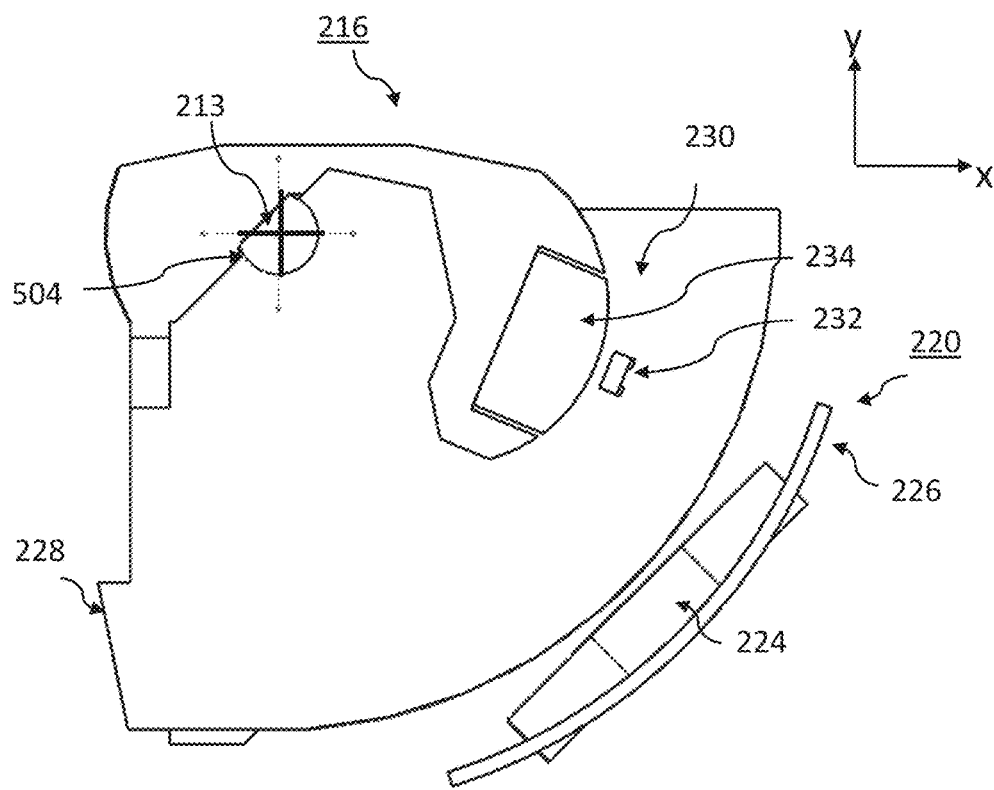
FIG. 5A shows an object-side OPFE (O-OPFE) and an O-OPFE actuation module in a side view.
Figure 5B:
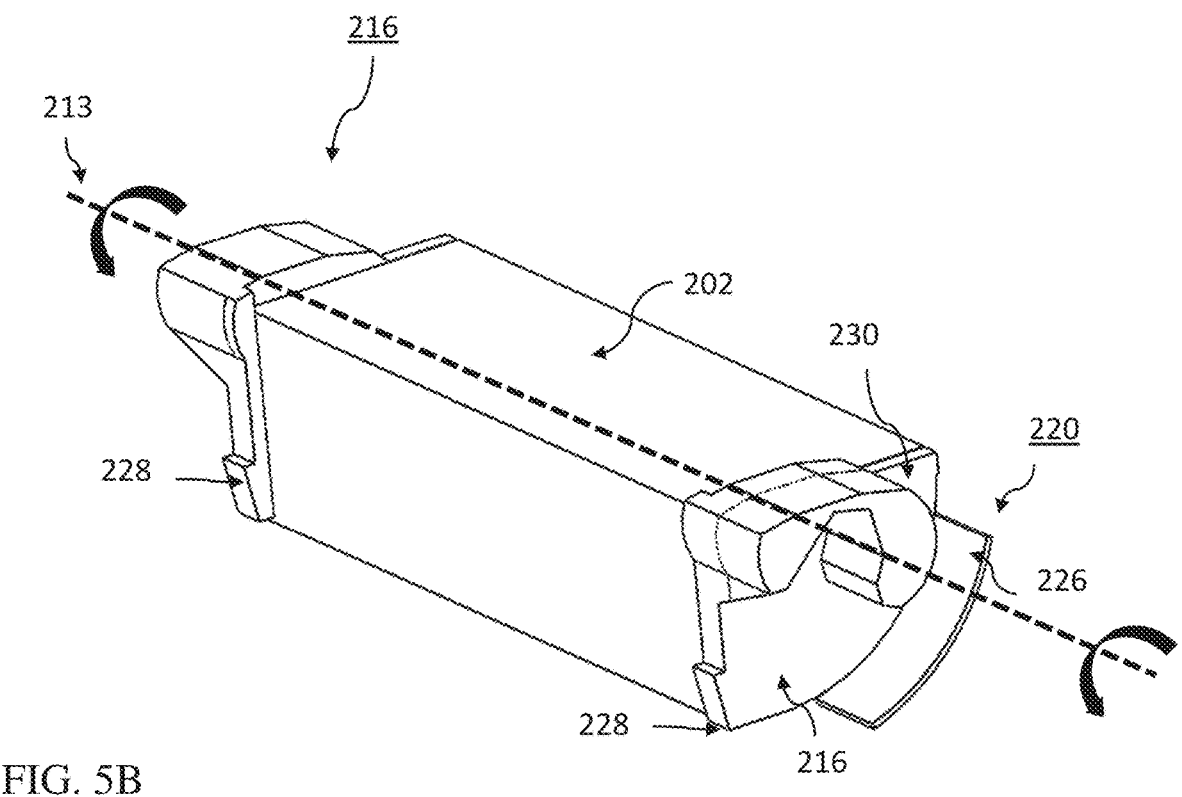
FIG. 5B shows an O-OPFE holder and the O-OPFE actuation module of FIG. 5A in a perspective view.
Figure 5C:
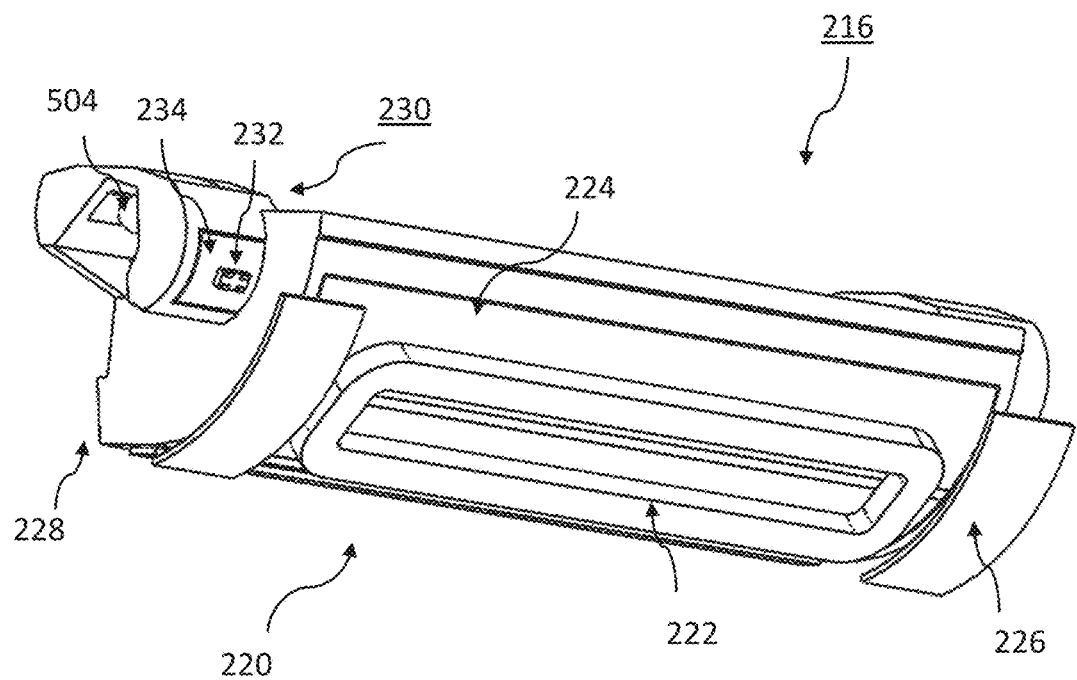
FIG. 5C shows the O-OPFE holder and the O-OPFE actuation module of FIGS. 5A-5B in another perspective view.
Figure 5D:
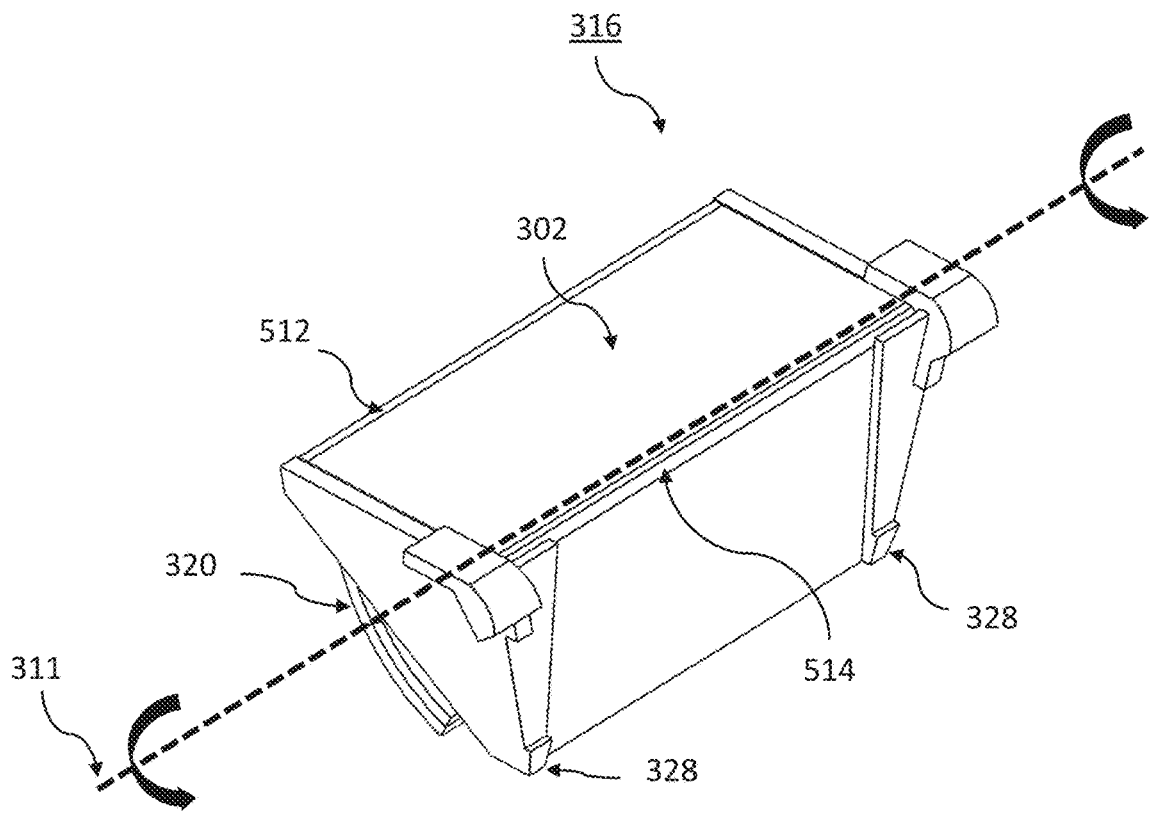
FIG. 5D shows another O-OPFE holder in a perspective view.
Figure 5E:
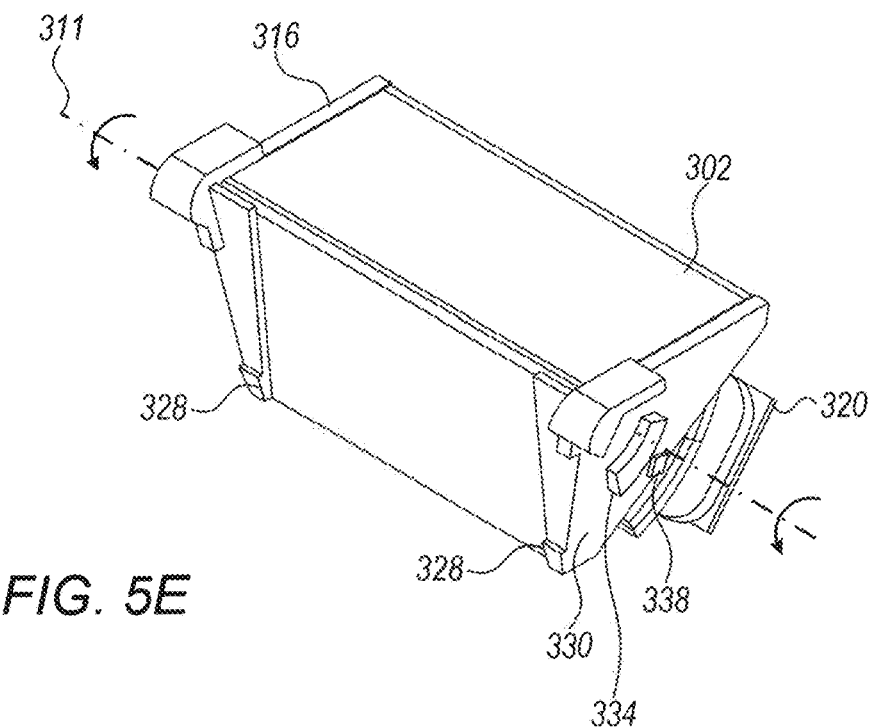
FIG. 5E shows the O-OPFE holder of FIG. 5D in another perspective view.
Figure 5F:
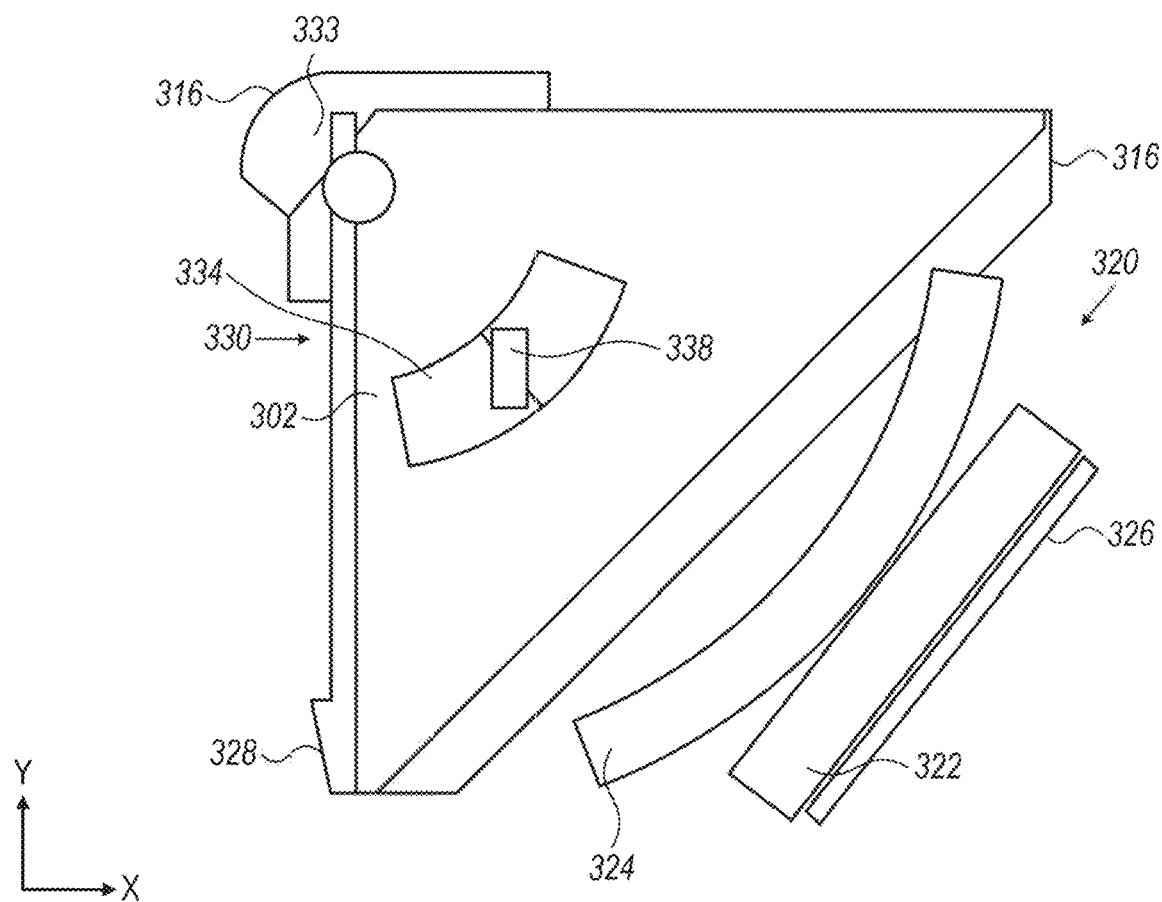
FIG. 5F shows the O-OPFE holder of FIG. 5D-5E in a side view.

O-OPFE actuator 312 includes an O-OPFE actuation module 320 and an O-OPFE sensing module 330 (see FIGS. 5E-F). O-OPFE actuation module 320 includes an actuation coil 322, an actuation magnet 324 and an actuation yoke 326. O-OPFE sensing module 330 includes a position sensor 338 (e.g. a Hall sensor, see FIGS. 5E-F) and a sensing magnet 334 (see FIGS. 5E-F). An advantage of separating O-OPFE actuation module 320 and O-OPFE sensing module 330 is that the position sensor 338 is decoupled from actuation coil 322.

Figure 9A:
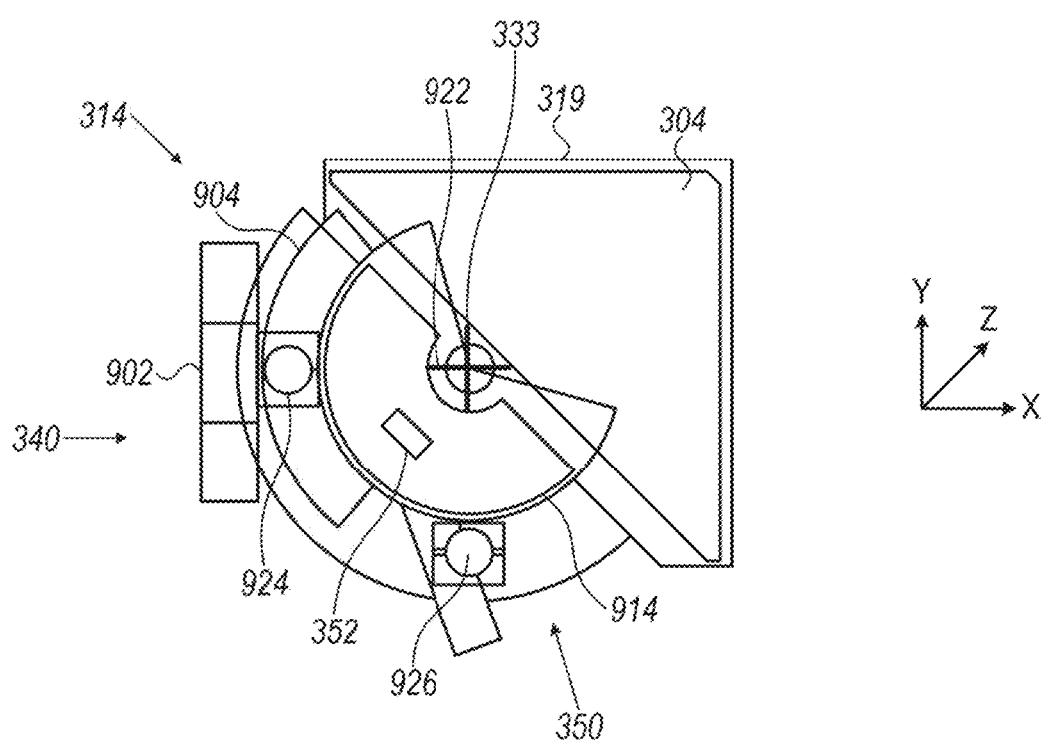
FIG. 9A shows the I-OPFE and I-OPFE actuator of FIG. 7C in a bottom view.
Figure 9B:
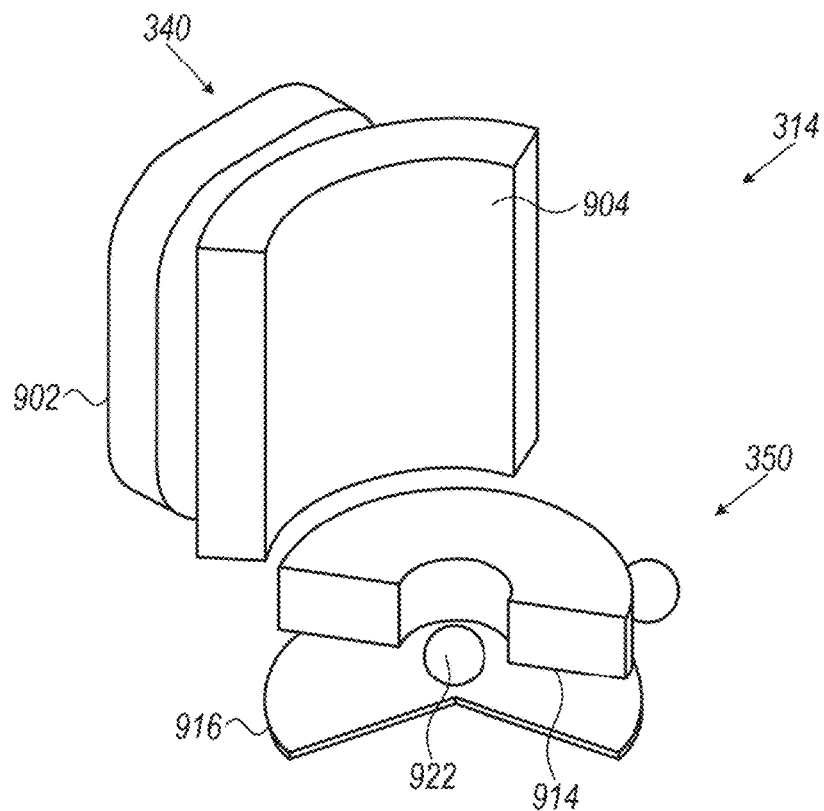
FIG. 9B shows the I-OPFE actuator without the I-OPFE in a perspective view.

I-OPFE actuator 314 includes an I-OPFE actuation module 340 (see FIGS. 9A-C) and an I-OPFE sensing module 350 (see FIGS. 9A, 9B). I-OPFE actuation module 340 includes a coil 902 and actuation magnet 904. I-OPFE sensing module 350 includes a position sensor 352 and a sensing magnet 914. An advantage of separating I-OPFE actuation module 340 and I-OPFE sensing module 350 is that position sensor 352 is decoupled from actuation coil 902. As visible in FIG. 9A, rotation axis 333 of I-OPFE 304 is far from I-OPFE actuation module 340, so there is a large lever for rotating I-OPFE 304. As shown in FIG. 9A, rotation axis 333 is relatively close to I-OPFE sensing module 340, so that the rotation of I-OPFE 304 can be sensed with a small stroke. FIG. 3A also shows a rotation axis 311 of O-OPFE 302 and a thickness $H_{I-H}$ of the upper and lower edges (surfaces) of I-OPFE holder 318. O-OPFE 302 is shown in a zero scan position.

Camera module 310 has a non-uniform (or non-planar) top surface 313, so that camera module 310 is divided into two regions, an elevated region 315 where camera module 310 has a module height $H_M$, and a "shoulder" region 317 where camera module 310 has a shoulder height $H_S$ smaller than $H_M$. Camera module 310 has a uniform (or planar) bottom surface 319. O-OPFE 302 is located in elevated region 315. I-OPFE 304, lens barrel 305, optical element 307 and image sensor 308 are located in the shoulder region 317.

An O-OPFE holder stopper 328 defines OPFE 302's rotation range by limiting the rotational movement of O-OPFE holder 316.

Figure 3B:
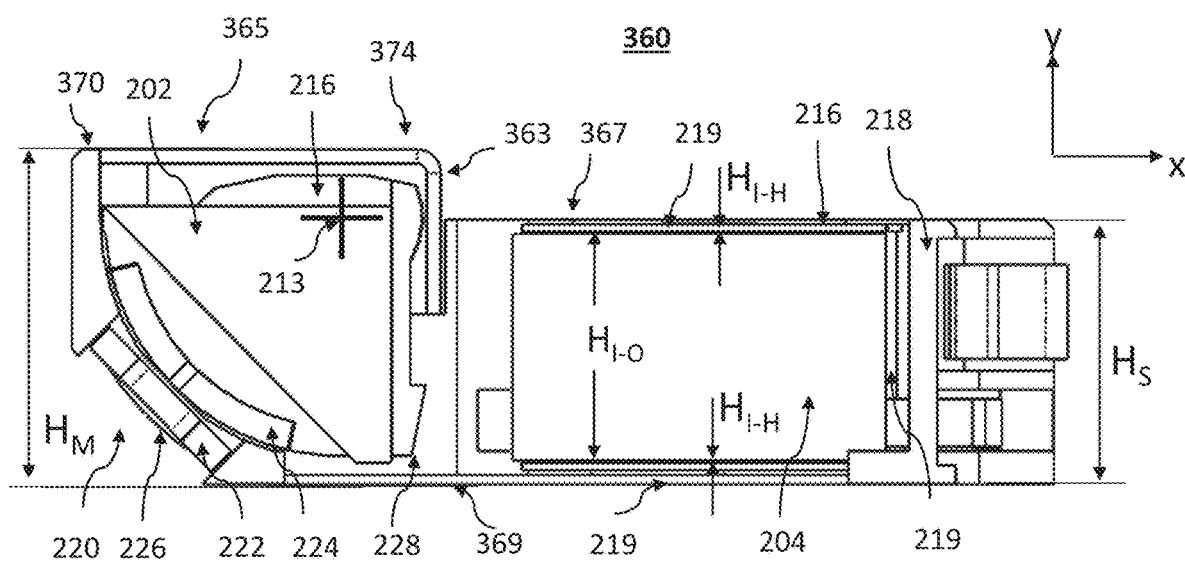
FIG. 3B shows in a cross-sectional view an embodiment of another camera module disclosed herein, which includes the folded STC shown in FIGS. 2A-2B.
Figure 3C:
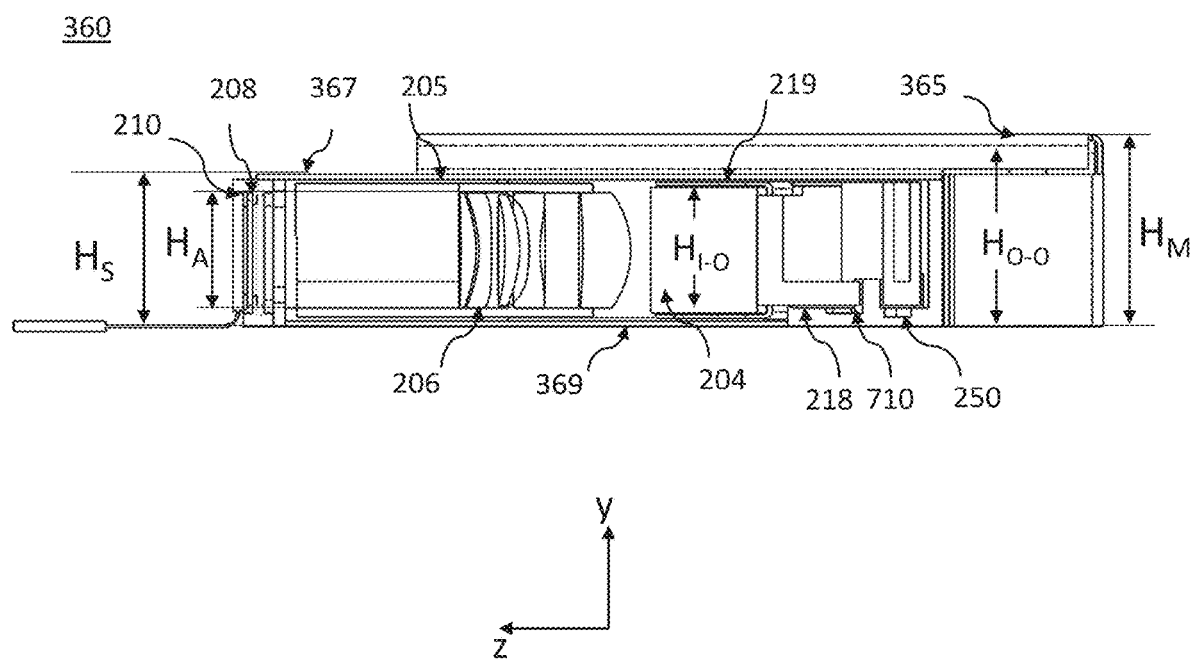
FIG. 3C shows the camera module of FIG. 3B in another cross-sectional view.

FIG. 3B shows in a cross-sectional view an embodiment of another camera module numbered 360 and which includes the STC shown in FIGS. 2A-2B. FIG. 3C shows camera module 360 in another cross-sectional view. Lens 206, rotation axis 213, a thickness $H_{I-H}$ of the upper and lower edges of I-OPFE holder 218, and an I-OPFE preload module 710 are visible in one or more of these figures. The height of lens 206 ("$H_A$") is marked.

O-OPFE 202 is shown in a zero scan position. Camera module 360 is surrounded by a camera module housing 370. Camera module 360 has a non-uniform (or non-planar) top surface 363, so that camera module 360 is divided into two regions, an elevated region 365 where camera module 360 has a module height $H_M$, and a shoulder region 367 where camera module 310 has a shoulder height $H_S$ smaller than $H_M$. Camera module 360 has a uniform (or planar) bottom surface 369. O-OPFE 202 is located in elevated region 365. I-OPFE 204, lens barrel 205, optical element 208 and image sensor 210 are located in the shoulder region 367.

Rotation axes 311 and 213 in, respectively, camera modules 310 and 360 are located such that rotating respectively O-OPFEs 302 and 202 does not cause any height penalty in module height $H_M$. This because rotating O-OPFEs 302 and 202 around rotation axes 311 and 213 respectively does not cause O-OPFE holders 316 and 216 to occupy y-values that are significantly smaller than the y-values that O-OPFE holders 316 and 216 occupy in the zero scan position.

O-OPFE holder stopper 228 defines OPFE 202's rotation range.

As known, a relatively low f number ("f/#") is desired for a compact camera, as a low f # increases the camera image's signal-to-noise ratio (SNR) and thus the camera's image quality. A low f/# is, amongst others, achieved by maximizing the aperture area ("AA") of the camera lens. For obtaining a STC having low f/#, AA is to be maximized, given a certain $H_S$ height constraint, which in turn is dictated by the height (or thickness) of a mobile device including the STC. For maximizing AA, one may maximize both $H_A$ (height of the lens aperture, measured along the y-axis, see FIG. 3C) and $W_A$ (width of the lens aperture, measured along the x-axis, i.e. perpendicular to the plane shown in FIG. 3C).

For maximizing $H_A$, a height difference ("penalty" or "P") between the $H_A$ and $H_S$ needs to be minimized. For minimizing P, maximizes $H_{I-O}$ needs to be maximized, as explained next. For minimizing $H_{I-H}$ (which maximizes $H_{I-O}$ for a given $H_S$), I-OPFE housing 219 may be made of metal. In an example, $H_{I-H}$ is about 0.15 mm. Housing 219 may be for example a metal frame that surrounds I-OPFE 204 in a "C"-shape both at its top, bottom and the one side that is not optically active. A small $H_{I-H}$ allows I-OPFE 204 to have a significantly larger height $H_{I-O}$ than I-OPFE 304 for a same shoulder height $H_S$. $H_{I-O}$ poses an upper limit for $H_A$ (see FIG. 3C), i.e. $H_{I-O} > H_A$. This because a $H_{I-O}$ smaller than $H_A$ will cause vignetting, i.e. light that could still reach the lens would be blocked by I-OPFE 204, reducing the aperture of the optical system.

$H_A$, $H_M$ and $H_S$, as well as respective heights $H_{O-O}$ (or $H_{O-OPFE}$—measured along y) of O-OPFE 202 and $H_{I-O}$ (or $H_{I-OPFE}$) of I-OPFE 204 are shown in FIGS. 3A-C.

In an example, camera module 360 has following values:
$H_S$=5.8 mm
$H_A$=4.4 mm
P=1.4 mm
$H_M$=7.3 mm
$H_{O-O}$=5.5 mm
$H_{I-O}$=4.8 mm In other examples, $H_S$ may have values in the range 3-15 mm, $H_A$ may have values in the range 2-13 mm, $H_M$ may have values in the range 4-20 mm, $H_{I-O}$ may have values in the range 2.5-15 mm and $H_{O-O}$ may have values in the range 2-20 mm.

For maximizing $W_A$, a lens such as 206 may be "cut" (or "D-cut") as known in the art. A cut lens includes one or more lens elements $L_i$ that have a height $H_{Li}$ which is smaller than their width $W_{Li}$. In some examples, $W_{Li}$ may be greater than $H_{Li}$ by a percentage of about 5%-100%. With respect to the example in camera module 360, $W_A$ of a cut lens 206 having a height of $H_A$=4.4 mm may be in the range $W_A$=4.4 mm-10 mm.

Figure 4:
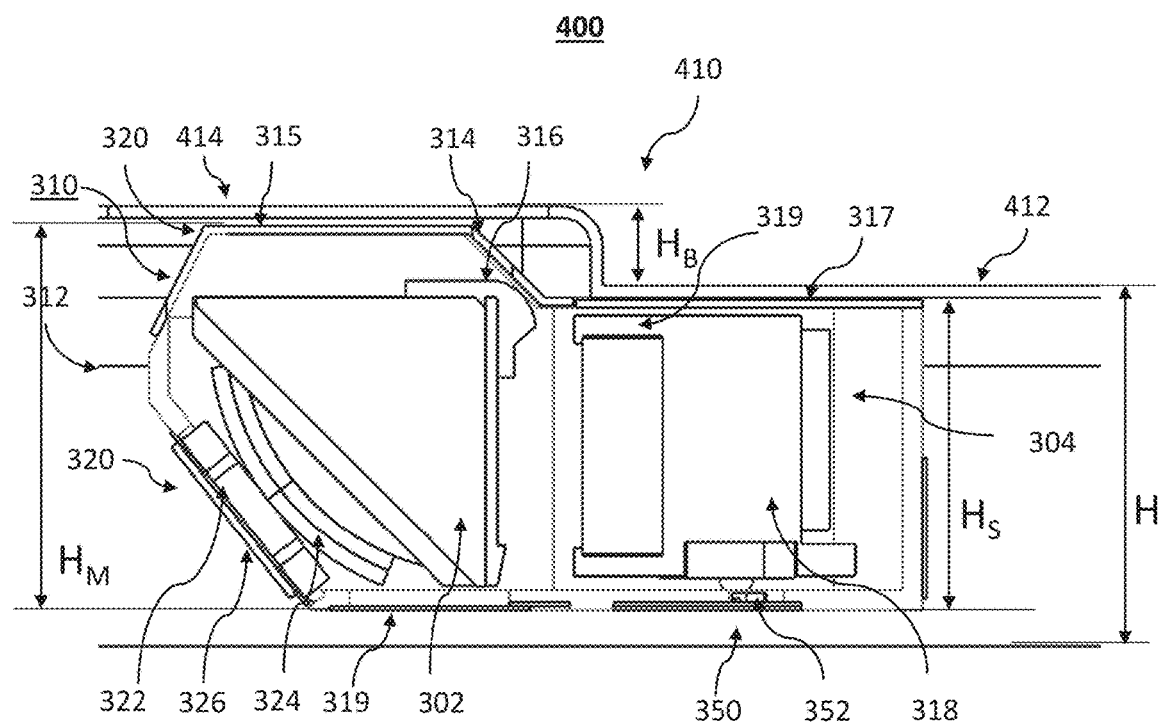
FIG. 4 shows a camera module disclosed herein in a cross-sectional view.

FIG. 4 shows a segment of a mobile device 400 that includes camera module 310 in a cross-sectional view. A rear (back) surface 410 of mobile device 400 is divided into two regions, a first regular region 412 where device 400 has a regular height H, and a second, "bump" region 414 where device 400 has an elevated height H+$H_B$. I-OPFE sensing module 350 and position sensor 352 are visible.

To compactly integrate camera module 310 into mobile device 400, elevated region 315 (having height $H_M$) is integrated in elevated bump region 414 of mobile device 400, and shoulder region 317 (having height $H_S$) is integrated in regular region 412 of mobile device 400. In other embodiments, camera module 360 may be included in a mobile device such as mobile device 400 in the same way, i.e. its elevated region 365 may be integrated in an elevated bump region of the mobile device, and its shoulder region 367 may be integrated in a regular region of the mobile device.

Figure 6A:
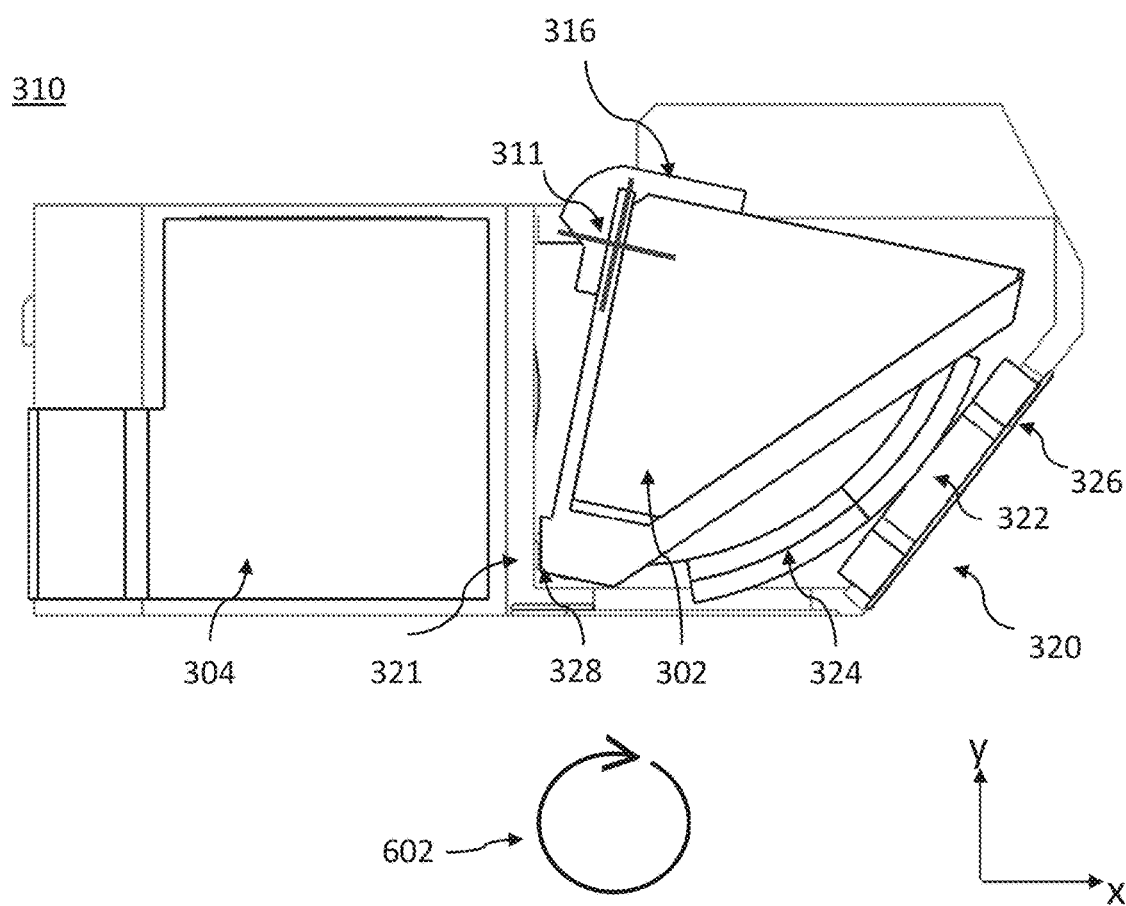
FIG. 6A shows a segment of the camera module of FIG. 3A in a cross-sectional view.

FIG. 5A shows O-OPFE holder 216, O-OPFE actuation module 220 and O-OPFE sensing module 230 in a side view. Rotation axis 213 and actuation yoke 226 are visible. The rotation is mediated by a pivot ball 504. An O-OPFE holder stopper 228 limits O-OPFE holder 216's movement range as shown in FIG. 6A. O-OPFE sensing module 230 is located next to OPFE 202 and the magnetic sensing occurs in a plane parallel to the x-y-plane.

FIG. 5B shows O-OPFE holder 216 and O-OPFE actuation module 220 in a perspective view. Two O-OPFE holder stoppers 228, rotation axis 213 and actuation yoke 226 are visible.

FIG. 5C shows O-OPFE holder 216 and O-OPFE actuation module 220 in another perspective view. O-OPFE actuation magnet 224 as well as some components shown in FIGS. 5A and 5B are visible here as well.

FIG. 5D shows O-OPFE holder 316 in a perspective view. O-OPFE holder 316 includes two stray light masks 512 and 514 for stray light prevention. O-OPFE 302 and O-OPFE 202 may be prisms made of high refractive index ("n") material (e.g. n>1.7) for compact beam guiding, allowing a compact camera module with <30% vignetting (light loss) even for maximal rotation angles and/or maximal optical fields.

FIG. 5E shows O-OPFE holder 316 in another perspective view. O-OPFE sensing module 330 including position sensor 338 and sensing magnet 334 are visible.

FIG. 5F shows O-OPFE holder 316 in yet another perspective view. O-OPFE actuation module 320 and O-OPFE sensing module 330 are visible. The magnetic sensing occurs in a plane perpendicular to the x-y-plane.

FIG. 6A shows a segment of camera module 310 in a cross-sectional view. O-OPFE 302 is shown in a maximum right scan position. "Right" scan position here refers to the fact that the n-$FOV_T$ of STC 300 is oriented towards the right by rotating O-OPFE 302 around rotation axis 311 in a clockwise rotation direction 602. In this position, O-OPFE holder stopper 328 limits a further clockwise rotational movement of O-OPFE holder 316 by touching module housing 321. This prevents O-OPFE holder 316 and I-OPFE holder 318 (not shown) from touching each other and it defines (or limits) the maximum rotation (or "scanning") range of O-OPFE 302 in clockwise direction. Consequently, O-OPFE holder stopper 328 allows a compact camera design (for example in a smartphone camera) by allowing O-OPFE 316 and O-OPFE 318 to be located close to each other.

Figure 6B:
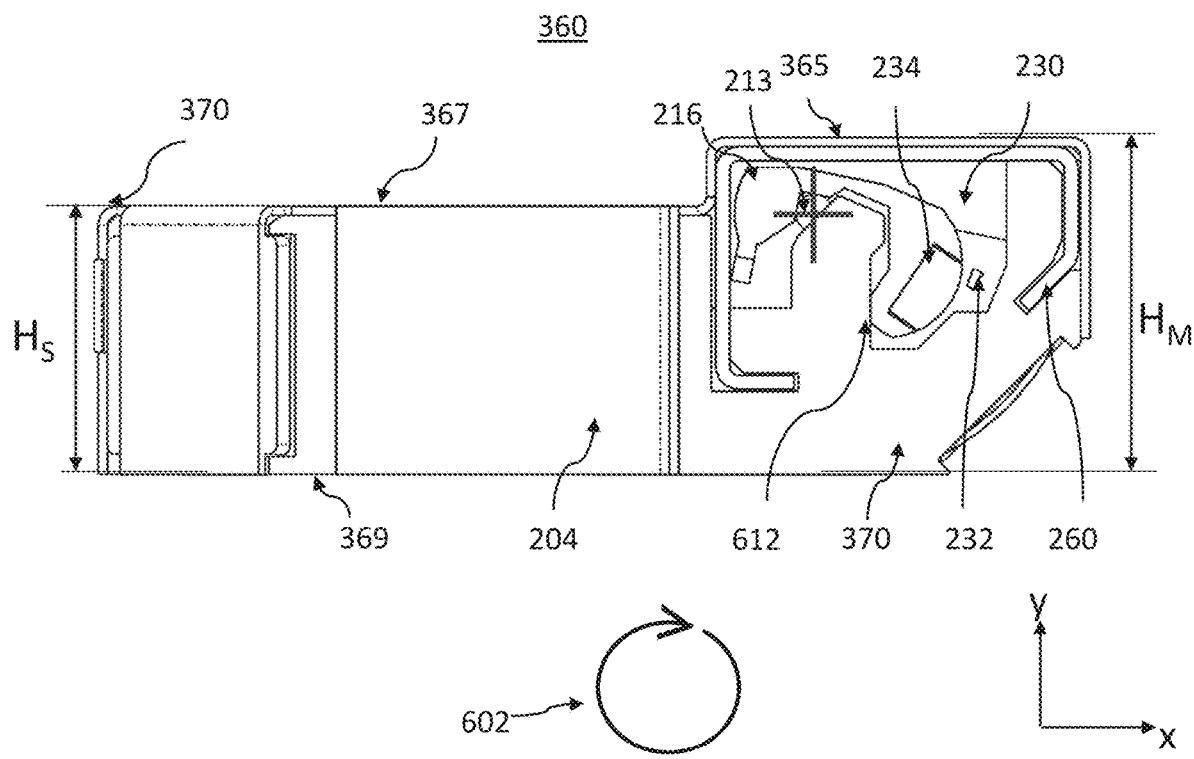
FIG. 6B shows a segment of camera module of FIG. 3B in a cross-sectional view.

FIG. 6B shows a segment of camera module 360 in a cross-sectional view. O-OPFE 202 is shown in a maximum right scan position. In this position, O-OPFE holder right stopper 612 limits a further clockwise rotational movement of O-OPFE holder 216 by touching module housing 370.

Figure 6C:
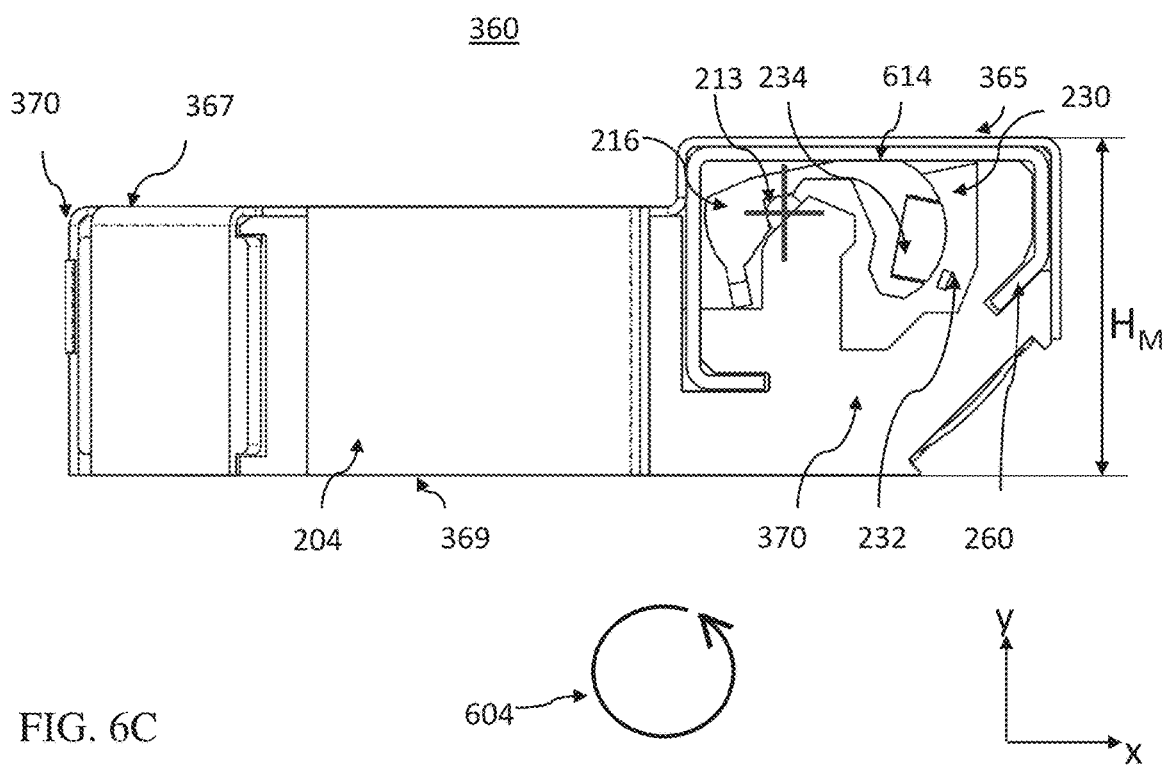
FIG. 6C shows the segment of camera module of FIG. 6B with an O-OPFE in a maximum left scan position.

FIG. 6C shows the segment of camera module 360 shown in FIG. 6B with O-OPFE 202 in a maximum left scan position. "Left" scan position here refers to the fact that the n-$FOV_T$ of STC 200 is oriented towards the left by rotating O-OPFE 202 around rotation axis 213 in a counter-clockwise rotation direction 604. O-OPFE holder left stopper 614 limits a further counter-clockwise rotational movement of O-OPFE holder 216 by touching module housing 370.

As shown in FIGS. 6B-C, the scanning range of O-OPFE 202 may be symmetric, i.e. a scanning range towards a left side (lower x-values) and right side (higher x-values) with respect to a zero scan position are identical. A maximum rotation range of O-OPFE 202 may be about ±11.5 degrees, wherein about ±10 degrees may be used for scanning the n-$FOV_T$, and about ±1.5 degrees may be used for OIS. In other examples, the scanning range may be used in a different ratio for FOV scanning and OIS, e.g. about ±10.5 degrees may be used for scanning the n-$FOV_T$, and about ±1.0 degrees may be used for OIS. In other examples, a maximum rotation range of O-OPFE 202 may be about ±5 degrees-±20 degrees.

Figure 7A:
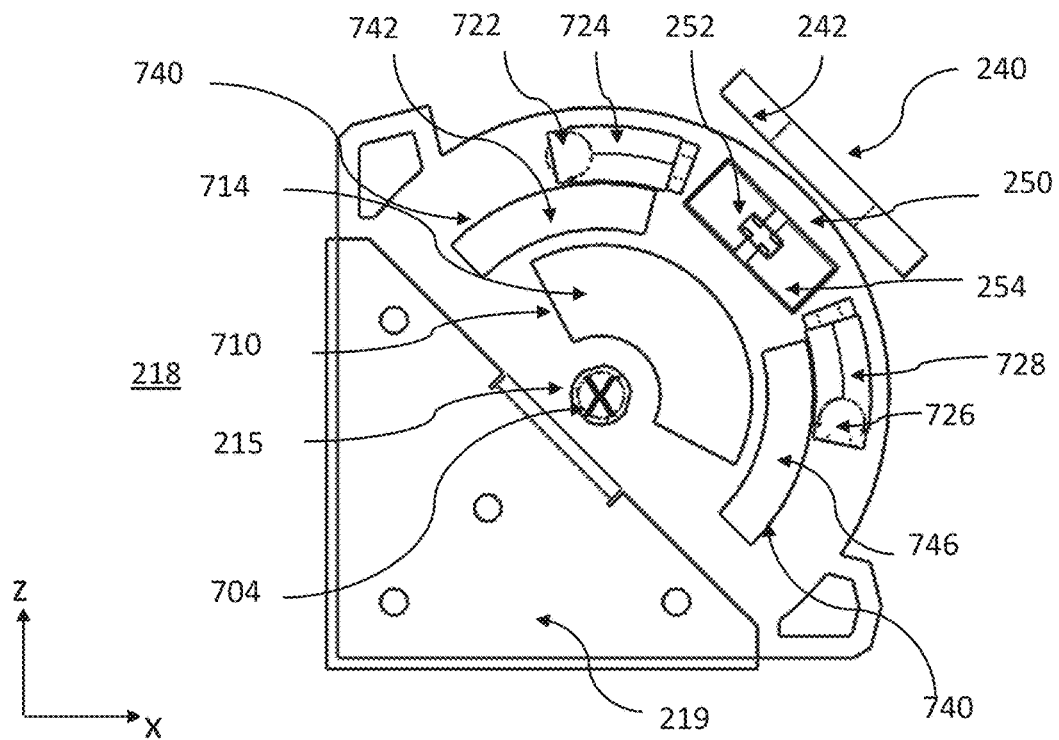
FIG. 7A shows an image side OPFE (I-OPFE) holder in the folded STC of FIG. 2A in a top view.

FIG. 7A shows I-OPFE holder 218 in a top view. Rotation axis 215 of I-OPFE holder 218 is shown. A pivot ball 704 is located in a pivot groove 706 (not visible here, but see FIG. 7B) at rotation center axis 215 to mediate the rotational movement. I-OPFE preload module 710 includes an I-OPFE preload magnet 712 (not visible here, but in FIG. 7B) and an I-OPFE preload yoke 714. I-OPFE holder 218 has independent modules for actuation (module 240), sensing (module 250) and preload (module 710). The rotation of I-OPFE 204 is mediated by two ball-groove mechanisms, a first one formed by ball 722 and groove 724, a second one formed by ball 726 and groove 728.

I-OPFE holder 218 includes an I-OPFE drop prevention and rotation stop module 740. Module 740 includes a first groove 742 and a second groove 746. A first pin 744 (not visible here, but in FIGS. 8A-B) is inserted in groove 742, and a second pin 748 (not visible here, but in FIGS. 8A-B) is inserted in groove 746.

Figure 7B:
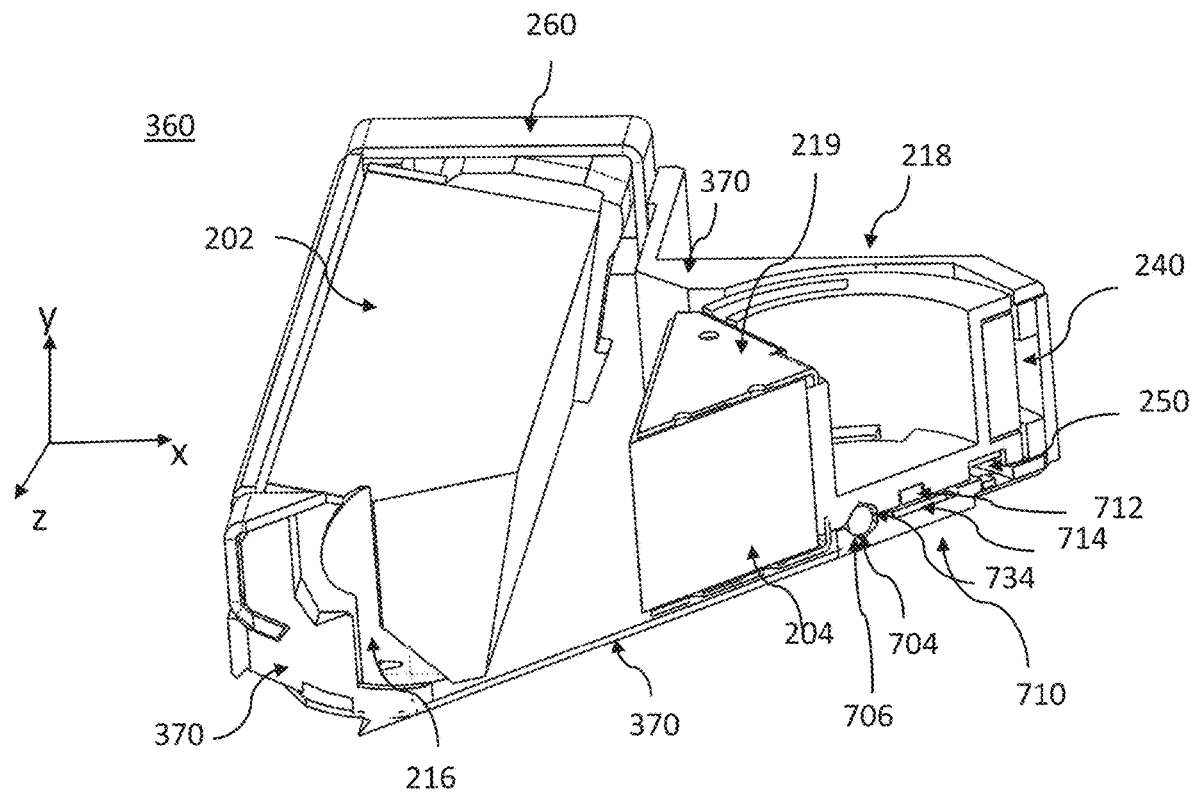
FIG. 7B shows the camera module of FIG. 3B without a module housing in a cross-sectional view.

FIG. 7B shows camera module 360 without housing module housing 370 in a cross-sectional view. Preload magnet 712 is visible.

Figure 7C:
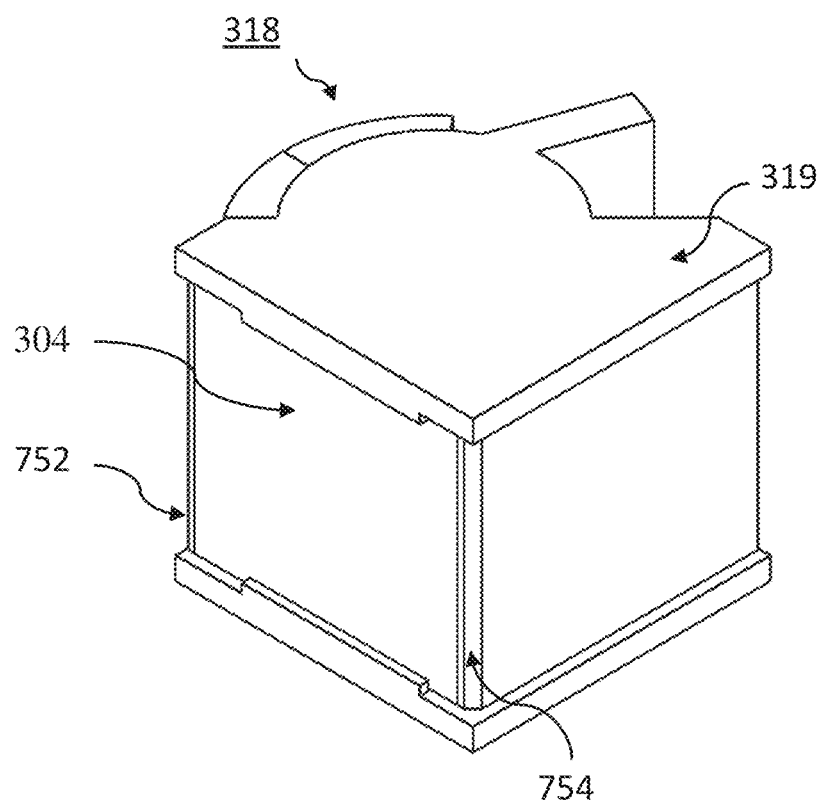
FIG. 7C shows an I-OPFE holder in the folded STC of FIG. 3A in a perspective view.

FIG. 7C shows I-OPFE holder 318 in a perspective view. I-OPFE holder 318 is shown here including two stray light masks 752 and 754 for stray light prevention.

Figure 8A:
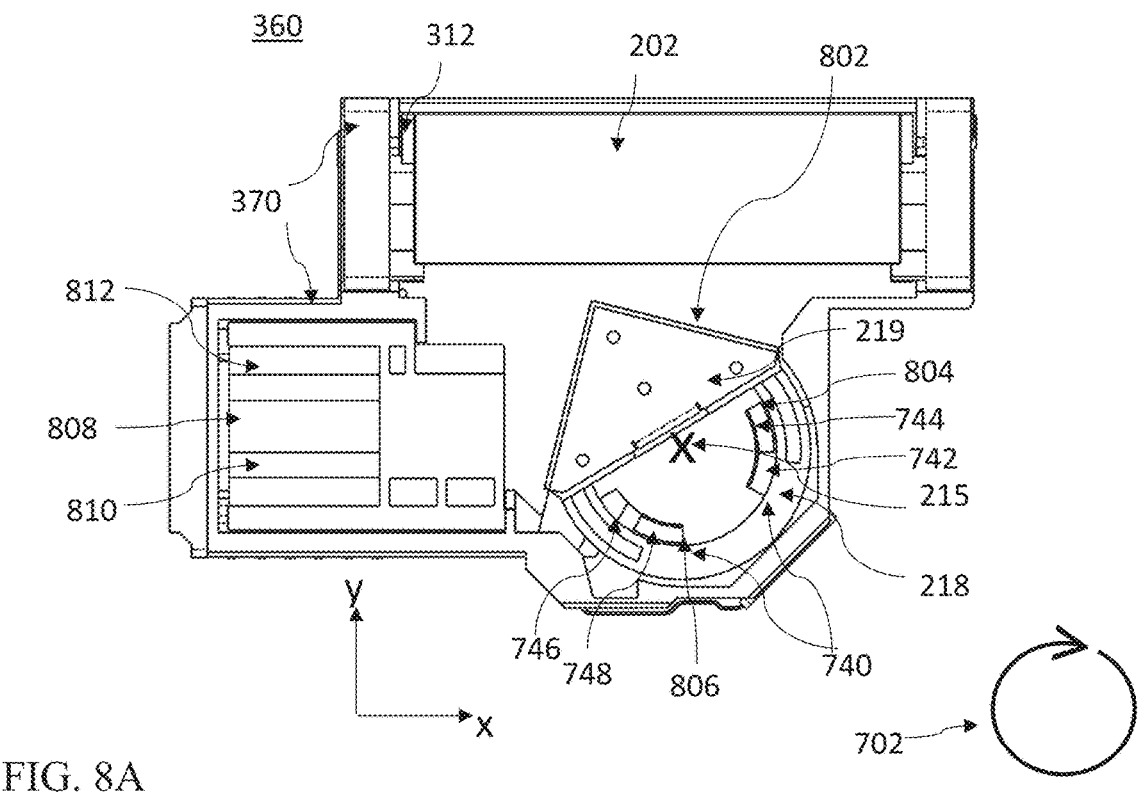
FIG. 8A shows the camera module of FIG. 3B without the module housing in a maximum right scan position in a cross-sectional view.

FIG. 8A shows camera module 360 without top surface 363 in a maximum right scan position in a cross-sectional view. "Right" scan position here refers to the fact that an object-facing side 802 of I-OPFE 204 is oriented towards the right by rotating it around rotation axis 215 in a clockwise rotation direction 702. Camera module 360 includes two I-OPFE drop prevention modules 740 designed to prevent I-OPFE holder 218 to fall out of a camera module such as 310 or 360 in case that an including mobile device is dropped. Each of the I-OPFE drop prevention modules 740 includes a pin and groove assembly: pin 744 is inserted in groove 742, and pin 748 is inserted in groove 746.

I-OPFE drop prevention and rotation stop module 740 is visible. It prevents I-OPFE holder 218 to fall out of a camera module such as 310 or 360 in case that a mobile device including it is dropped. Module 740 additionally limits the rotational movement of I-OPFE 204. In the maximum right scan position, pin 744 and pin 748 touch a top margin (the margin with the highest y-value) 804 and a right margin (the margin with the highest x-value) 806 of groove 742 and 746 respectively. This prevents I-OPFE 204 from further clockwise rotation.

A lens barrel actuation ball guide module 808 includes two groove-rail modules 810 and 812 that mediates the movement of lens barrel 205.

Figure 8B:
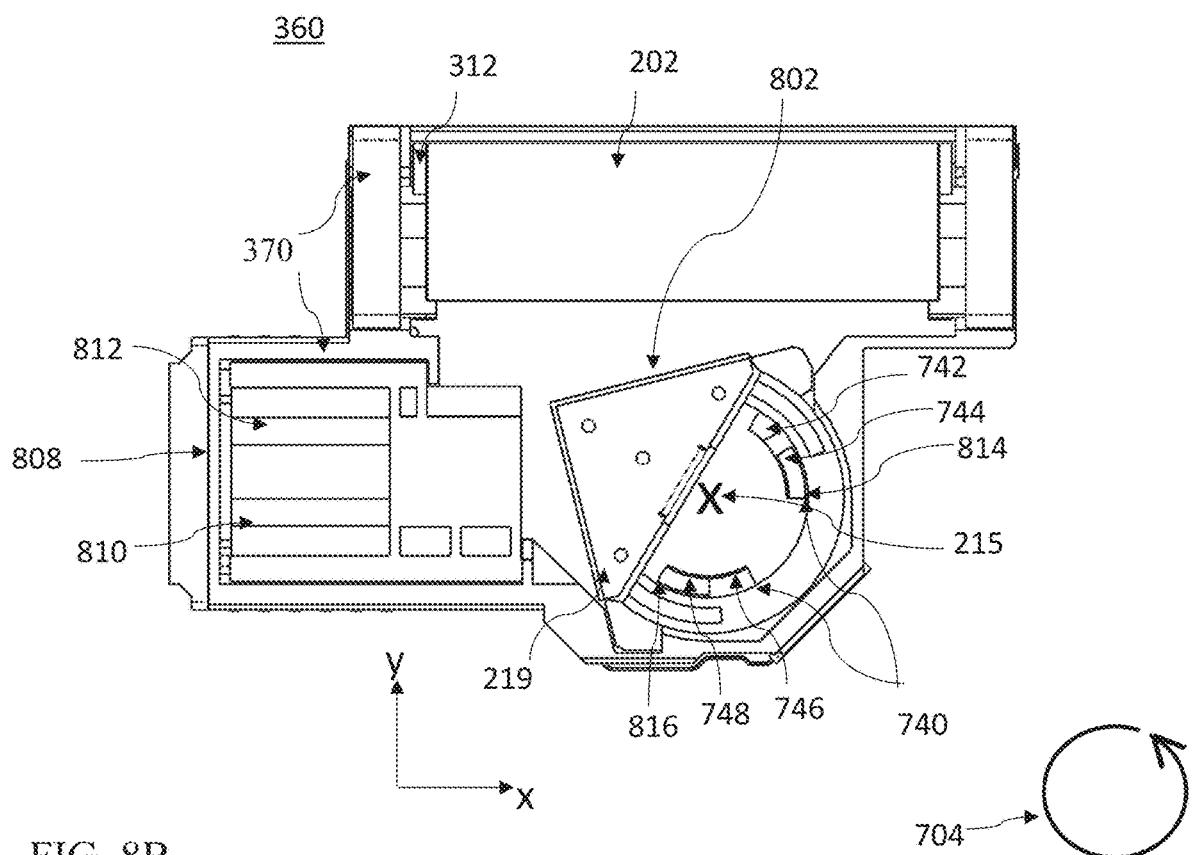
FIG. 8B shows the camera module of FIG. 3B without the module housing in a maximum left scan position in a cross-sectional view.

FIG. 8B shows camera module 360 without top surface 363 in a maximum left scan position in a cross-sectional view. Object-facing side 802 of I-OPFE 204 is oriented towards the left by rotating it around rotation axis 215 in a counter-clockwise rotation direction 704. In maximum left scan position, pin 744 and pin 748 touch a bottom margin 814 (the margin with the lowest y-value) and a left margin 816 (the margin with the lowest x-value) of groove 742 and 746 respectively.

As seen in FIGS. 8A-B, the scanning range of I-OPFE 204 may be symmetric, i.e. a scanning range towards a left side (lower x-values) and right side (higher x-values) with respect to a zero scan position are identical. A maximum rotation range of I-OPFE 204 may be about ±14 degrees, wherein about ±12.5 degrees may be used for scanning the n-$FOV_T$, and about ±1.5 degrees may be used for OIS. In other examples, the scanning range may be used in a different ratio for FOV scanning and OIS. In other examples, a maximum rotation range of I-OPFE 204 may be about ±5 degrees-±25 degrees.

Figure 9C:
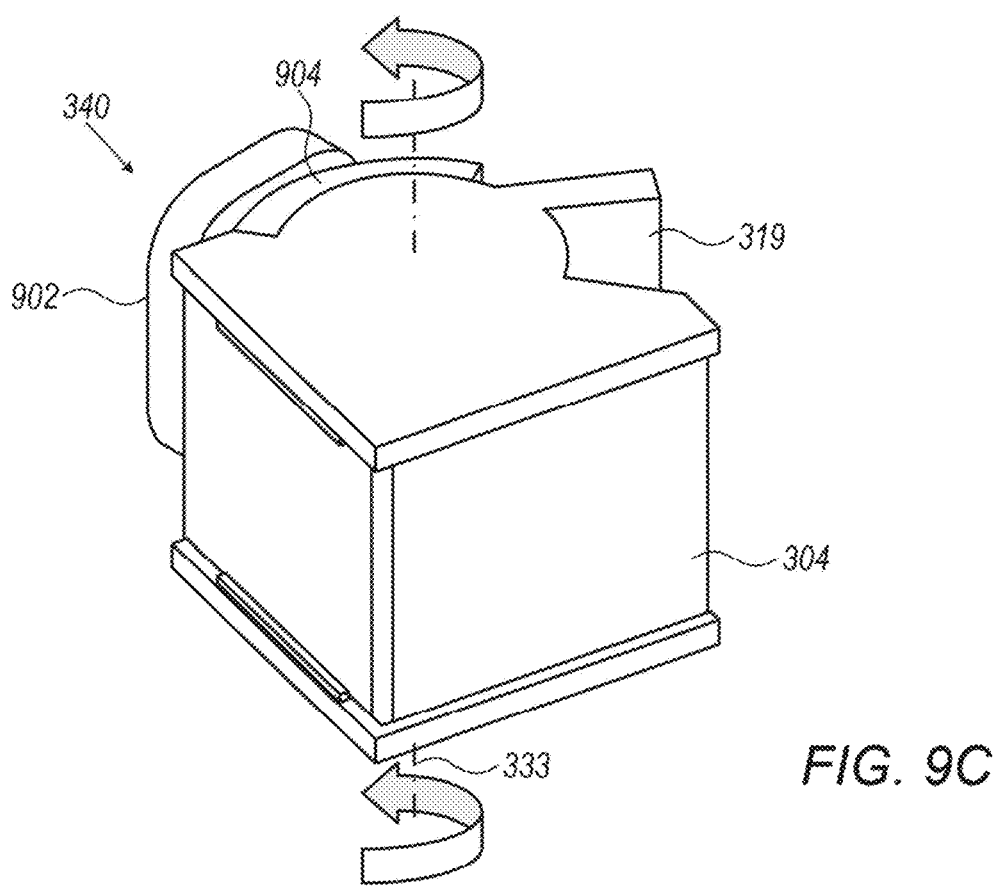
FIG. 9C shows the I-OPFE and the I-OPFE actuation module in a perspective view.

FIGS. 9A-C show I-OPFE 304 as well as I-OPFE actuator 314 which rotates I-OPFE 304 around rotation axis 333. I-OPFE actuator 314 includes I-OPFE actuation module 340 and I-OPFE sensing module 350.

FIG. 9A shows I-OPFE 304 and I-OPFE actuator 314 in a bottom view. I-OPFE actuation module 340 includes an actuation coil 902 and an actuation magnet 904. I-OPFE sensing module 350 includes position sensor 352 and a sensing magnet 914. A pivot ball 922 is located at rotation axis 333. Pivot ball 922 and support balls 924 and 926 mediate the rotation of I-OPFE 304.

FIG. 9B shows I-OPFE actuator 314 without I-OPFE 304 in a perspective view. FIG. 9C shows I-OPFE 304 and I-OPFE actuation module 340 in a perspective view. Sensing yoke 916 which is included in I-OPFE sensing module 350 is visible. The axis of rotation 333 is marked. A sensing yoke 916 which is included in I-OPFE sensing module 350 is visible in both FIGS. 9B and 9C.

The use of two separate magnets (904 and 914) provides separation of sensing and actuation. Position sensor 352 is decoupled from the magnetic field of coil 902. Rotation axis 333 is at a relatively large distance from I-OPFE actuation module 340, providing a large lever for rotational actuation. Rotation axis 333 is at relatively short distance from position sensor 352, so that sensing of large rotational actuation I-OPFE 304 can be performed within a small stroke.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

Furthermore, for the sake of clarity the term "substantially" is used herein to imply the possibility of variations in values within an acceptable range. According to one example, the term "substantially" used herein should be interpreted to imply possible variation of up to 5% over or under any specified value. According to another example, the term "substantially" used herein should be interpreted to imply possible variation of up to 2.5% over or under any specified value. According to a further example, the term "substantially" used herein should be interpreted to imply possible variation of up to 1% over or under any specified value.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present disclosure.

What is claimed is:

1. A camera module, comprising:
   a scanning Tele camera (STC):
   an object side optical path folding element O-OPFE for folding a first optical path OP1 to a second optical path OP2;
   an O-OPFE actuator;
   an image side optical path folding element I-OPFE for folding OP2 to a third optical path OP3;
   an I-OPFE actuator;
   a lens; and
   an image sensor,
   wherein the STC has a STC native field-of-view n-$FOV_T$, wherein the O-OPFE actuator is configured to rotate the O-OPFE around a first axis and the I-OPFE actuator is configured to rotate the I-OPFE around a second axis for moving the n-$FOV_T$, wherein the camera module is divided into a first region having a module region height $H_M$ and a second region having a shoulder region height $H_S<H_M$, and wherein $H_S<15$ mm and $H_M<20$ mm.

2. The camera module of claim 1, wherein the STC includes a lens actuator, wherein the lens actuator is configured to move the lens for focusing along a third axis, and wherein the first axis is perpendicular to the second axis and parallel to the third axis.

3. The camera module of claim 1, wherein the first axis is parallel to OP3.

4. The camera module of claim 1, wherein $H_S<12.5$ mm and $H_M<15$ mm.

5. The camera module of claim 1, wherein the O-OPFE is located in the module height region, and wherein the I-OPFE, the lens and the image sensor are located in the shoulder height region.

6. The camera module of claim 1, wherein the lens has a maximum aperture height $H_A$, and wherein $H_S<H_A+6$ mm.

7. The camera module of claim 6, wherein $H_S<H_A+5$ mm.

8. The camera module of claim 6, wherein $H_S<H_A+3.5$ mm.

9. The camera module of claim 1, wherein the lens is a cut lens, the cut lens including one or more lens elements Li having a height $H_{Li}$ measured along OP1 and a width $W_{Li}$ measured along OP2 and wherein $H_{Li} \leq 0.9 \cdot W_{Li}$.

10. The camera module of claim 1, wherein the rotation of the O-OPFE and of the I-OPFE is by more than ±7.5 degrees around a zero scan position.

11. The camera module of claim 1, wherein the STC has an effective focal length of 7-50 mm.

12. The camera module of claim 1, wherein the first axis is located at a position such that rotating the O-OPFE does not cause any height penalty in $H_M$.

13. The camera module of claim 1, wherein the STC is configured to move the n-$FOV_T$ to perform optical image stabilization.

14. The camera module of claim 1, wherein the STC is configured to move the n-$FOV_T$ to scan a scene with the n-$FOV_T$.

15. The camera module of claim 1, wherein the STC is included in a mobile device.

16. The camera module of claim 15, wherein the mobile device has a regular region with a regular height H and a bump region with a bump height $H+H_B$, and wherein the module height region is included in the bump region and the shoulder height region is included in the regular region.

17. The camera module of claim 15, wherein the mobile device is a smartphone.

18. A multi-camera comprising the camera module of claim 1, together with a Wide camera having a Wide camera image sensor and a Wide field-of-view $FOV_W$, wherein the STC has a scanning $FOV_T$ (s-$FOV_T$), wherein s-$FOV_T$ has a horizontal dimension H-$FOV_T$ and wherein $FOV_W$ has a horizontal dimension H-$FOV_W$.

19. The multi-camera of claim 18, wherein H-$FOV_T$>0.7× H-$FOV_W$.

20. The multi-camera of claim 18, wherein s-$FOV_T$ covers a 16:9 segment of $FOV_W$.

* * * * *